US008208917B2

(12) United States Patent
Ueda

(10) Patent No.: US 8,208,917 B2
(45) Date of Patent: Jun. 26, 2012

(54) WIRELESS AND DOCKABLE AUDIO INTERPOSER DEVICE

(75) Inventor: Joji Ueda, Cambridge, MA (US)

(73) Assignee: Bose Corporation, Framingham, MA (US)

( * ) Notice: Subject to any disclaimer, the term of this patent is extended or adjusted under 35 U.S.C. 154(b) by 970 days.

(21) Appl. No.: 11/927,366

(22) Filed: Oct. 29, 2007

(65) Prior Publication Data

US 2009/0112338 A1   Apr. 30, 2009

(51) Int. Cl.
    H04W 4/00    (2009.01)
(52) U.S. Cl. .................. 455/426.2; 455/426.1; 455/420; 700/94
(58) Field of Classification Search ............... 455/426.2, 455/426.1, 420; 700/94
    See application file for complete search history.

(56) References Cited

U.S. PATENT DOCUMENTS

| 5,991,640 | A * | 11/1999 | Lilja et al. ..................... 455/557 |
| 7,062,238 | B2 * | 6/2006 | Glaza .......................... 455/161.1 |
| 7,482,951 | B1 * | 1/2009 | Brungart et al. .............. 340/975 |
| 7,509,178 | B2 | 3/2009 | Logan et al. |
| 2002/0197955 | A1 * | 12/2002 | Witkowski et al. ............. 455/41 |
| 2003/0045265 | A1 * | 3/2003 | Huang et al. .................. 455/355 |
| 2003/0223409 | A1 * | 12/2003 | Wiebe .......................... 370/352 |
| 2004/0097263 | A1 * | 5/2004 | Katayama et al. ......... 455/556.1 |
| 2004/0121748 | A1 | 6/2004 | Glaza |
| 2005/0009574 | A1 * | 1/2005 | Lin ............................ 455/569.2 |
| 2005/0064835 | A1 | 3/2005 | Gusler et al. |
| 2005/0135297 | A1 * | 6/2005 | Katayama ..................... 370/328 |
| 2005/0286546 | A1 * | 12/2005 | Bassoli et al. ................. 370/432 |
| 2006/0046656 | A1 * | 3/2006 | Yang ............................ 455/41.3 |
| 2006/0072525 | A1 * | 4/2006 | Hillyard et al. ............... 370/338 |
| 2006/0270395 | A1 * | 11/2006 | Dhawan et al. ............... 455/418 |
| 2006/0287745 | A1 | 12/2006 | Richenstein et al. |
| 2007/0087686 | A1 * | 4/2007 | Holm et al. .................. 455/3.06 |
| 2007/0103723 | A1 | 5/2007 | Wolcott et al. |
| 2007/0129006 | A1 | 6/2007 | Goldberg et al. |
| 2007/0136637 | A1 | 6/2007 | Majima |
| 2007/0160225 | A1 * | 7/2007 | Seydoux ......................... 381/79 |
| 2007/0223725 | A1 * | 9/2007 | Neumann et al. ............... 381/80 |
| 2008/0114819 | A1 | 5/2008 | vom Scheidt et al. |
| 2008/0159560 | A1 | 7/2008 | Song et al. |

FOREIGN PATENT DOCUMENTS

| EP | 1052834 | 11/2000 |
| EP | 1460769 | 9/2004 |
| WO | 2006006910 A1 | 1/2006 |
| WO | 2007103723 | 9/2007 |
| WO | 2007117788 | 10/2007 |

OTHER PUBLICATIONS

International Search Report and Written Opinion dated Feb. 23, 2009 for International Appl. No. PCT/US2008/080594.

(Continued)

*Primary Examiner* — Nick Corsaro
*Assistant Examiner* — Sowmini Nair

(57) ABSTRACT

An apparatus meant to be interposed between a wired device and a wireless device gathers information concerning the functions of which each of the wired device and wireless devices are capable, and induces the wireless device to enable a wider range of wireless protocols by presenting the wireless device with a false indication to the effect that the apparatus is capable of performing a wider array of functions than is the case to make possible an interaction between the wired and wireless devices through the apparatus in support of various audio-related functions.

28 Claims, 8 Drawing Sheets

OTHER PUBLICATIONS

Ling-Jyh, Chen et al: "Audio Streaming Over Bluetooth : An Adaptive ARQ Timeout Approach", Distributed Computing Systems Workshops, 2004. Proceedings. 24th International Conference on Hachioji, Tokyo, Japan; Mar. 23-24, 2004. pp. 196-201.
International Search Report and Written Opinion dated Nov. 25, 2008 for International Appl. No. PCT/US2008/68909, filed Jul. 11, 2008.
International Search Report and Written Opinion dated Mar. 17, 2009 for International Appl. No. PCT/US2008/080595.
International Search Report and Written Opinion dated Mar. 17, 2009 for International Appl. No. PCT/US2008/080592.
International Preliminary Report on Patentability dated Feb. 25, 2010 for Appl. No. PCT/US2008/080594.
International Preliminary Report on Patentability dated Oct. 14, 2009 for PCT/US2008/069809.
EP Office Action dated May 31, 2010 for EP Appl. No. 08796158.7-1246.
International Preliminary Report on Patentability dated May 14, 2010 for Appl. No. PCT/US2008/080595.
International Report on Patentability dated May 14, 2010 for Appl. No. PCT/US2008/080592.
EP Office Action dated Mar. 8, 2011 for EP Application No. 08844762.8-1525.
EP Office Action dated Mar. 17, 2011 for EP Application No. 08843399.0-1525.

* cited by examiner

WIRELESS AND DOCKABLE AUDIO INTERPOSER DEVICE

FIELD

This description relates to sharing audio through a device that is both wireless and dockable.

BACKGROUND

It is commonplace for users of personal electronic devices, such as cell phones, MP3 music players and PDAs, to also acquire various wired devices designed to connect to those personal electronic devices and function as accessories to those personal electronic devices. Such wired devices have included headphones, battery chargers, audio docking devices, docking interfaces for cars, and home entertainment systems featuring docking interfaces. The more sophisticated among these wired devices have used multi-purpose digital buses in their connections with those personal electronic devices, including digital serial buses at least partly conforming to the "Universal Serial Bus" specification (USB specification) promulgated by the USB Implementers Forum, Inc. of Beaverton, Oreg. These accessories allowed such users to take their personal electronic devices from place to place and enjoy listening to audio and performing other tasks with those devices at each location, as well as on the way to each location.

However, various wireless devices meant to be used as accessories with personal electronic devices have become prevalent much more recently, providing wireless communications capabilities that allow their use with personal electronic devices as accessories, but without the inconvenience of a physical connection. Such wireless devices have also included headphones, wireless home entertainment systems, and wireless interfaces to other audio devices, including car audio systems. The more sophisticated among these wireless devices have used multi-purpose point-to-point RF wireless links permitting the exchange of many forms of commands and data beyond simply audio, including wireless point-to-point links at least partly conforming to the "Bluetooth" specification promulgated by the Bluetooth Special Interest Group of Bellevue, Wash.

While the additional convenience of wireless devices versus wired devices may be attractive, even for users of personal electronic devices capable of communicating with wireless devices, the fact that they have already purchased and own multiple wired devices may discourage them from ever making use of wireless communications due to the considerable investment they've already made. This can be especially true where the wired device they would have to replace is a large and expensive one such as a home entertainment system or audio docking device, or where considerable effort would be required such as the non-trivial task of replacing a docking interface in a car with a wireless one.

Further, despite the convenience of wireless devices versus wired devices arising from the lack of a need for a physical connection with a personal electronic device, a majority of the personal electronic devices with wireless communications capability that are currently available are designed with a limitation that actually puts the use of wireless communications at a disadvantage in comparison to the user of wired communications. For the sake of ensuring security between the personal electronic device and a wireless device, a manually-initiated registration between the personal electronic device and the wireless device must often be performed in which information about that wireless device is stored within the personal electronic device, causing that one wireless device to become the one and only wireless device with which the personal electronic device engages in wireless communications for a given purpose (e.g., listening to stereo audio, or hands-free two-way telephone communications). This means that if a user of a personal electronic device having this limitation wishes to switch from using it with a first wireless device for a given purpose to using the personal electronic device with a second wireless device for that same purpose, the user must manually initiate a new registration between the personal electronic device and the second wireless device. However, initiating the new registration for the second wireless device undoes the registration that had earlier been done for the first wireless device such that if the user wishes to go back to using the first wireless device with the personal electronic device for that same purpose, the user must again manually initiate another registration procedure to do so. This limitation is frequently encountered with personal electronic devices employing wireless communications conforming to the Bluetooth specification. This contrasts sharply in its lack of convenience in comparison to the ease with which it is possible for a user to switch between using any two wired devices that he or she chooses to use with a personal electronic device for a given purpose. For example, switching between a wired pair of high quality around-ear (or circumaural) headphones to a wired pair of in-ear headphones (or earphones) for the purpose of listening to stereo audio is typically a matter of simply disconnecting one and connecting the other, without any device registration requirements.

SUMMARY

An apparatus meant to be interposed between a wired device and a wireless device gathers information concerning the functions of which each of the wired device and wireless devices are capable, and induces the wireless device to enable a wider range of wireless protocols by presenting the wireless device with a false indication to the effect that the apparatus is capable of performing a wider array of functions than is the case to make possible an interaction between the wired and wireless devices through the apparatus in support of various audio-related functions.

In one aspect, the invention features an apparatus that includes a processor, a transceiver accessible to the processor and configured to engage in wireless communications with a wireless device to receive a first piece of audio from the wireless device, a connector accessible to the processor and configured to connect with a wired device to convey the first piece of audio to the wired device, and a storage accessible to the processor and having a routine stored therein comprising a sequence of instructions. When the sequence of instructions is executed by the processor, the processor is caused to operate the transceiver to transmit to the wireless device across a point-to-point link formed with the wireless device a false indication that the apparatus is capable of performing at least one audio function of which the apparatus is not capable of performing to induce the wireless device to enable the use of a protocol across the link to transfer the first piece of audio across the link, await an indication that the wired device is connected to the connector, operate the transceiver to use the protocol to cause the wireless device to transfer the first piece of audio across the link, and convey the first piece of audio to the wired device to enable the wired device to perform the at least one audio function.

Implementations of the invention may include one or more of the following features. Implementations could include the connector being structured to mimic functions of a substantially similar connector of the wireless device, or being made up of ganged together connectors that are engaged substantially simultaneously when a wired device is connected. Implementations could include the at least one audio function including two-way audio communications and/or exchange of remote control commands. Implementations could include assembling a list of audio functions to be claimed as being performed by the apparatus, either from selections of audio functions through a user interface or from the audio functions determined to be performed by various wired devices that are connected to the connector over time.

In one aspect, the invention features a method that includes transmitting to a wireless device across a point-to-point link formed with the wireless device a false indication that an apparatus to which a wired device is connected is capable of performing at least one audio function of which the apparatus is not capable of performing to induce the wireless device to enable the use of a protocol across the link to transfer a first piece of audio across the link, operate a transceiver of the apparatus to use the protocol to cause the wireless device to transfer the first piece of audio across the link, determine that the wired device is capable of performing the at least one audio function; and convey the first piece of audio to the wired device through a wired connection through a connector to enable the wired device to perform the at least one audio function.

Implementations of the invention may include one or more of the following features. Implementations could include operating the connector being to mimic functions of a substantially similar connector of the wireless device. Implementations could include the at least one audio function including two-way audio communications and/or exchange of remote control commands. Implementations could include assembling a list of audio functions to be claimed as being performed by the apparatus, either from selections of audio functions through a user interface or from the audio functions determined to be performed by various wired devices that are connected to the connector over time.

In one aspect, the invention features a machine-readable medium storing a sequence of instructions that when executed by a processor of an audio interposer device cause the processor to, transmit to a wireless device across a point-to-point link formed with the wireless device a false indication that the audio interposer device is capable of performing at least one audio function of which the audio interposer device is not capable of performing to induce the wireless device to enable the use of a protocol across the link to transfer a first piece of audio across the link, operate the transceiver to use the protocol to cause the wireless device to transfer the first piece of audio across the link, determine that a wired device connected to the audio interposer device through a connector of the audio interposer device is capable of performing the at least one audio function, and convey the first piece of audio to the wired device through a wired connection through the connector to enable the wired device to perform the at least one audio function.

DESCRIPTION

Figure 1:
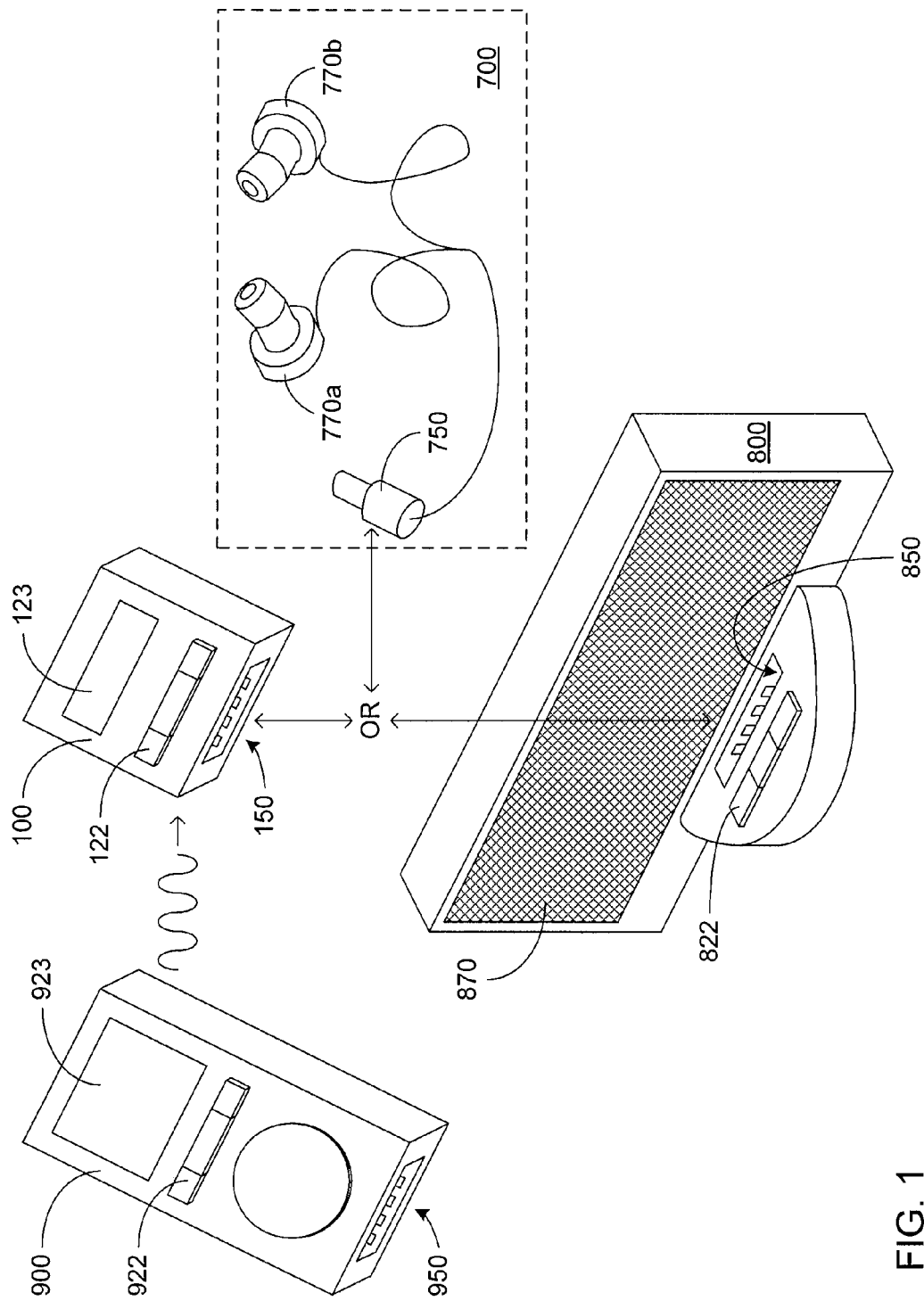
FIG. 1 depicts an audio interposer device interposed between a wireless device and one of a selection of wired devices.

FIG. 1 depicts a possible operation of an audio interposer device 100 as interposed between a personal electronic device 900 and a pair of earphones 700, or interposed between the personal electronic device 900 and an audio docking device 800. The personal electronic device 900 incorporates a connector 950 capable of being connected directly to either of a connector 750 of the pair of earphones 700 or a connector 850 of the audio docking device 800, wherein the pair of earphones 700 and the audio docking device 800 are but two examples of wired devices. The personal electronic device 900 is capable of conveying audio to and receiving commands from whatever wired device is connected to the connector 950 employing various protocols associated with that wired connection. However, the personal electronic device 900 also incorporates a wireless transceiver by which the personal electronic device 900 is capable of forming a wireless point-to-point link with a wireless device. With that link formed, the personal electronic device 900 is capable of conveying audio to and receiving commands from that wireless device employing various protocols associated with that link. In other words, the personal electronic device 900 is capable of conveying audio to and receiving commands from either wired or wireless devices using appropriate protocols associated with each form of communication. As a result, the personal electronic device 900 is capable of operating as either a wired or wireless device, however, throughout much of the discussion to follow, the personal electronic device 900 is operated largely as a wireless device.

When interposed between the personal electronic device 900 and either the pair of earphones 700 or the audio docking device 800, the audio interposer device 100 interacts with the personal audio device 900 as a wireless device in a point-to-point wireless link using the protocols associated with that link, while also interacting as a wired device with whichever one of the earphones 700 or the audio docking device 800 is connected to the connector 150 of the audio interposer device 100 using protocols associated with that wired connection. While so interposed, the audio interposer device 100 conveys audio and commands between the wireless and wired forms of communications in which the audio interposer device 100 is engaged. To enable this conveyance of audio and commands, the audio interposer device 100 may engage in initialization procedures for each of the wireless and wired forms of communication where the audio interposer device 100 exchanges indications of functionality and/or identity with each of the wireless and wired devices with which the audio interposer device 100 is in communication. With such initialization procedures completed, the audio interposer device 100 may use the indications of functionality and/or identity received from each of the wired and wireless devices with which the audio interposer device 100 is in communication to engage in a conversion between the protocols of the wireless and wired forms of communications in which the audio interposer device 100 is engaged. Such conversion of protocols may entail converting audio (as well as other non-audio data) from one format in which it was received from the point-to-point wireless link into another format (perhaps including converting the audio from digital to analog) for conveying through the connector 150 to a wired device connected thereto. Such conversion of protocols may also entail converting commands received through the connector 150 into equivalent commands for transmission across the point-to-point wireless link to a wireless device.

In essence, and as will be explained in greater detail, the audio interposer device 100 operates its connector 150 to mimic the operation of the connector 950 of the personal electronic device 900 to present a wired connection capability to wired devices meant to be substantially indistinguishable to those wired device from the wired connection capability of the personal electronic device 900. Also, audio interposer device 100 uses wireless protocols to mimic a wireless device supporting a wide range of audio and other functions in a wireless point-to-point link with the personal electronic device 900 to induce the personal electronic device 900 to enable the use of the link for a myriad of audio, command and other functions. In this way, the audio interposer device 100 provides the user of the personal electronic device 900 with a form of wireless "telepresence" in that wired devices (such as the pair of earphones 700 and the audio docking device 800) that would normally need to be directly connected to the connector 950 of the personal electronic device 900 in order to be used with the personal electronic device 900 can be mated to the audio interposer device 100, instead. This is meant to alleviate the need for a user of the personal electronic device 900 to obtain and use only wireless devices with the personal electronic device 900 in order to have the convenience of using a wireless link over a physical connection between the personal electronic device 900 and various wired devices.

The use of the audio interposer device 100 to enable the personal electronic device 900 to communicate wirelessly with wired devices also provides an additional benefit that overcomes the limitation of many existing forms of the personal electronic device 900 restricting the registration of wireless devices to only one wireless device at any one time for a given purpose. Once the audio interposer device 100 is registered with the personal electronic device 900 for a given purpose, then any of a wide variety of wired devices may be connected to the audio interposer device 100 at any time to serve that given purpose without a repeat of the registration being required. As a result, the use of wired devices may become preferable to the use of their wireless equivalents.

The personal electronic device 900 may be of any of a variety of types of personal electronic device, including and not limited to, various multimedia, information handling and/or communications devices such as a cell phone, a digital music player (e.g., a typical MP3 music file player), portable camera with audio playback functionality, a personal data assistant (PDA), or a personal navigation device (such as a global positioning system receiver). At a minimum, the personal electronic device 900 provides audio either in digital form across a wireless point-to-point link, or in analog and/or digital form through the connector 950. This audio may be any of a variety of forms of audio, including and not limited to, digitized music stored on the personal electronic device 900, and audio received by the personal electronic device 900 from an RF transmission (e.g., FM or satellite radio). The personal electronic device 900 may also be capable of receiving remote control commands from a wireless point-to-point link or through the connector 950 to enable the remote control of various functions of the personal electronic device 900, including commands related audio (e.g., commands to stop, pause, play, fast-forward, adjust a volume, change a channel, etc.). The commands may correspond to functions accessible through a manually-operable control 922 incorporated into the personal electronic device 900. The personal electronic device 900 may also be capable of transmitting textual or other data beyond audio, including song titles, track titles, time, date, GPS coordinates, RF signal strength, etc. These various pieces of data may correspond to data displayable on an indicator 923 incorporated into the personal electronic device 900.

The pair of earphones 700 and the audio docking device 800 are shown in FIG. 1 chiefly to illustrate some of the wide range in differences in the types of wired devices that a user of the personal electronic device 900 may choose to connect to the connector 150 of the audio interposer device 100, instead of the connector 950 of the personal electronic device, in order to use those wired devices in a wireless manner with the personal electronic device 900. The pair of earphones 700 incorporates a connector 750 at one end of a cable and a pair of acoustic drivers 770a and 770b at the other end of the cable that are inserted into opposite ears to enable listening to audio. The audio docking device 800 is meant to serve as an example of a more complex form of wired device able to perform multiple functions, such as output audio, remote controlling another device, and charging a battery of another device. The audio docking device 800 incorporates one or more acoustic drivers 870 along with a manually-operable control 822. The audio docking device 800 also incorporates a connector 850 in a so-called "docking port" configuration where either the personal electronic device 900 or the audio interposer device 100 would be held in place in a cradle-like manner and supplied with power by the audio docking device 800 to recharge a battery associated with the audio interposer device 100. As the audio docking device is also shown for illustrative purposes, the audio docking device 800 may be substituted with a docking port built into an automobile dashboard, a docking port physically separate from and attached to an audio device by a cable, or other similar wired devices.

For the audio interposer device 100 to engage in conveying audio, commands and/or other data between itself and a wireless device (such as the personal electronic device 900), a wireless point-to-point link must first be formed between them. The technology on which this link is based dictates what is entailed in its formation, and that link may be of any of a wide variety of types employing RF signals, infrared signals, or any of a variety of other forms of wireless transmission media. Where RF signals are employed, the link may at least partially conform to the Bluetooth specification, or to any of a variety of other specifications for wireless networking as would be appropriate for the range and power limitations of portable devices that may be carried by a user on his or her person. As those familiar with such wireless specifications will readily recognize, such wireless communications are often accompanied with security mechanisms that include requiring two devices that are to be in such communication with each other to first undergo a link establishment procedure between them by which identification codes, security keys, etc., are exchanged between them. Depending on the technology on which the link is based, the audio interposer device 100 supports the carrying out of such a link establishment procedure.

Similarly, for the audio interposer device 100 to engage in conveying audio, commands and/or other data between itself and a wired device (such as either the pair of earphones 700 or the audio docking device 800), the wired device must first be connected to the connector 150. As it is intended that the audio interposer device 100 mimic the behavior of a given wireless device in the manner in which the audio interposer device operates the connector 150, such mimicry may dictate a specific behavior that must be exhibited by the audio interposer device 100 through the connector 150 in response to the connection of a wired device to the connector 150. This behavior may also include an exchange of identification codes, security keys, etc., or this behavior may be as simple as activating one or more contacts of the connector 150 to enable the conveying of audio, commands and/or other data. Where a digital serial bus is implemented through the connector 150, that digital serial bus may at least partially conform to the USB specification, or to any of a variety of other peripheral device digital bus specifications.

With the wireless point-to-point link having been formed and with the wired device having been connected to the connector 150, the audio interposer device 100 gathers information concerning the wireless and wired devices to identify the functional capabilities of each and various parameters concerning the conveying of audio, commands and/or other data to and/or from each. Where procedures involving an exchange of information have already been performed in either forming the link or preparing the connector 150 for communications, the audio interposer device 100 may have already received information from one or both of the wireless and wired devices indicating their functional capabilities. However, where this has not occurred, or where the received information is not complete enough, the audio interposer device 100 may carry out further procedures to obtain more information about one or both of the wired and wireless devices. The primary purpose in obtaining information on the wired or wireless devices is to determine what protocols and/or data formats are to be used in communications with each of these devices. Where one or both of the wireless and wired devices does not provide sufficient information (or does not provide any information, at all), the audio interposer device 100 may perform a number of tests, including tests for occurrences of expected responses to various signals provided to one or both of these devices, to attempt to deduce the identity and/or the extent of the functionality of each.

Depending on the technologies employed in communications either across the wireless point-to-point link or the through the connector 150, the audio interposer device 100 may be required to provide information to each of the wireless and wired devices about its own functionality. However, it should be noted that since the audio interposer device 100 is meant to be interposed between the wireless and wired devices to convey audio, commands and/or other data between them, information concerning the functionality of the audio interposer device 100 sent to each device should more properly be based on the functionality of the other device. However, from the perspective of each device, the functionality offered by the audio interposer device 100 to that device is actually the combination of the functionality of the audio interposer device 100 and of the other device. By way of example, where the wired device is the pair of earphones 700, which incorporates only the pair of acoustic drivers 770a and 770b, and where the audio interposer device 100 incorporates a manually-operable control 122 and an indicator 123, the audio interposer device 100 is able to offer both the functions of audio output through the pair of earphones 700 and of both remote control and textual data viewing functionality through the audio interposer device 100, itself. Therefore, learning of the functionality of each of the wired and wireless devices is, at least potentially, of use to the audio interposer device 100 in provide its own indications of functionality to each of the wired and wireless devices.

Given that at least some of the technologies on which the wireless point-to-point link may be based may require cumbersome procedures to be repeatedly performed whenever there is a change of wireless device on either end of that link, as is typically the case where the Bluetooth specification for a wireless link is followed, the audio interposer device 100 may ease the burden on the user by presenting the wireless device with which it wirelessly communicates with false indications of the range of functionality of the audio interposer device 100. More specifically, where the point-to-point link between the audio interposer device 100 and the wireless device at least partially conforms to the Bluetooth specification, the audio interposer device 100 falsely indicates having support for multiple Bluetooth "profiles" (more commonly referred to as protocols in other forms of wireless technology). Among the Bluetooth profiles that the audio interposer device 100 may falsely indicate having support for may be the general audio/video distribution profile (GAVDP), the advanced audio distribution profile (A2DP), the human interface device protocol (HIDP), the audio/video remote control profile (AVRCP), and the serial port profile (SPP).

The exact set of false indications that the audio interposer device 100 presents to a wireless device across a point-to-point link may be permitted to be chosen by a user of the audio interposer device 100, may be a preselected set of functions deemed to be of use under most circumstances, or may be learned by the audio interposer device 100 through the audio interposer device 100 identifying various wired devices that the user attaches to the audio interposer device 100 and their functions. Regardless of how the set of false indications of functionality to be presented to the wireless device are chosen, the intention is to present a set of false indications that induce the wireless device to always enable support for a variety of protocols and/or data formats for wireless communications. By so doing, the user is free to connect whatever wired devices that he or she may wish to the connector 150 of the audio interposer device 100, and have the benefit of as much use of the capabilities of each of those wired devices with the wireless device through the audio interposer device 100 as the wireless device is capable of supporting without having to engage in cumbersome procedures to cause the wireless device to provide that support each time the user connects a different wired device to the audio interposer 100. Although, in some embodiments, the audio interposer device 100 may also present a wired device with similar false indications, this is far less likely to be necessary as most wired devices requiring such information are often able to respond to changes in the functionality of a device to which they are connected without subjecting a user to repeated manual interactions to initiate cumbersome procedures.

Drawing on what is depicted in FIG. 1 as an example of the advantages of providing such false indications, a user of both the personal electronic device 900 and the audio interposer device 100 may wish to be able to user either of the pair of earphones 700 or the audio docking device 800 with the personal electronic device 900 through the audio interposer device 100. However, as has been previously mentioned, the range of capabilities of the pair of earphones 700 and the audio docking device 800 do differ. Furthermore, as has also been previously mentioned, the audio interposer device 100 also provides a range of capabilities that can be combined with those of either the pair of earphones 700 or the audio docking device 800. More specifically, the pair of earphones 700 provide the ability for the user to listen to stereo audio through a pair of acoustic drivers 770a and 770b, while the audio docking device 800 provides the ability to remotely control the personal electronic device 900 through a manually-operable control 822 in addition to providing perhaps the ability to listen to surround sound audio through at least one acoustic driver 870 and/or other acoustic drivers not shown. Additionally, the audio interposer device 100 may provide the ability to display textual information through the indicator 123. Since either of the pair of earphones 700 or the audio docking device 800 may be connected to the connector 150 at any time by the user, the audio interposer device falsely presents the personal electronics device 900 with indications of having the capabilities of receiving and playing both stereo and surround sound audio, the capability of acting as a remote control able to remotely operate the personal electronic device 900, and the capability of displaying textual data. The audio interposer device 100 does this without regard to which wired device is connected to the connector 150, and without regard to whether or not any wired device is connected to the connector 150, at all. In this way, the personal electronic device 900 is induced into enabling communications protocols and/or audio data formats that support conveying both stereo and surround sound audio to the audio interposer device 100, is induced into enabling communications protocols and/or command formats that support receiving remote control commands from the audio interposer device 100, and is induced into enabling communications protocols and/or textual data formats that support conveying textual data to the audio interposer device 100. With the personal electronic device 900 being induced to enabling all of these protocols and/or data formats, the user is free to connect whichever wired devices he or she chooses, and those wired devices will immediately have the benefit of any of those protocols and/or data formats as needed.

With the wireless link and wired connection through the connector 150 fully established, device information exchanged as needed, and protocols enabled, the audio interposer device 100 is able to be operated to at least convey audio (and perhaps other non-audio data) from a wireless device (such as the personal electronic device 900) to a wired device (such as either of the pair of earphones 700 or the audio docking device 800), and perhaps to also convey commands from the wired device to the wireless device. However, given that the wireless link and the wired connection employ different technologies, and likely employ different protocols, the audio interposer device 100 may perform a number of conversions between protocols and/or data formats in conveying audio, commands and/or other data between the wireless link and the wired connection of the connector 150. The audio interposer device may also have to generate false responses and/or false data to be provided to one or both of the wired and wireless devices as part of these conversions, especially where converting from one protocol to another or where the audio interposer device 100 must simulate the presence of a capability that may not truly be available at a given time. The audio interposer device 100 may make use of information concerning functionality and/or identity received from the wired and wireless devices to determine what conversions, false responses and/or simulations of missing capabilities are required.

Either the indications provided by the wired and wireless devices, or deductions made concerning those devices as a result of tests may be employed by the audio interposer device to determine how to respond to attempts by the wired and/or wireless devices to make use of a capability not possessed by the other of those two devices. More specifically, depending on the range of capabilities that a wired device connected to the connector 150 is indicated or deduced to have, the audio interposer device 100 may convey only audio received from the wireless device through the connector 150, or may additionally convey commands and/or non-audio data through the connector 150. By way of example, upon connection to the connector 150, a relatively simple wired device incorporating little more than a connector and one or more acoustic drivers (such as a simple form of the pair of earphones 700) may not provide indicators of its functionality, and would likely be revealed by tests to be capable of little more than accepting analog audio from the audio interposer device 100. In response, the audio interposer device 100 may convey nothing more than audio that was received from the wireless device and converted into analog form through the connector 150, while simply discarding commands and/or non-audio data received from the wireless device. Alternatively, where the audio interposer device 100 has some ability to at least respond to the commands and/or to carry them out, the audio interposer device 100 may attempt to do so on behalf of the wired device, such acting as the volume control for the wired device and carrying out volume adjustment commands from the wireless device. By way of another example, upon connection to the connector 150, a more complex wired device incorporating a user interface in addition to multiple acoustic drivers to accommodate audio having multiple audio channels (such as the audio docking device 800 incorporating a manually-operable control 822 and perhaps a human-viewable indicator of some type) would likely provide an indication of its functionality. In response, the audio interposer device 100 may convey audio received from the personal electronic device 900 in digital form (presuming that this more complex wired device incorporates its own digital-to-analog converter), and may further convey commands and/or data related to the received audio through the connector 150.

In this way, the audio interposer device 100 also alters the manner in which its user interface functions, depending on the capabilities of the wired device connected to the connector 150. Where a very simple wired device is so connected, the audio interposer device 100 may provide control over more features through its user interface in response to the simpler wired device not being able to provide such control over the wired device to the user, itself. Similarly, where a more sophisticated wired device is connected to the connector 150 such that this more sophisticated device has a more complete user interface, the audio interposer device 100 may not provide as large a degree of control over the wired device, since that is likely to prove to be largely redundant to the degree of control already provided by the wired device, itself.

Figure 2:
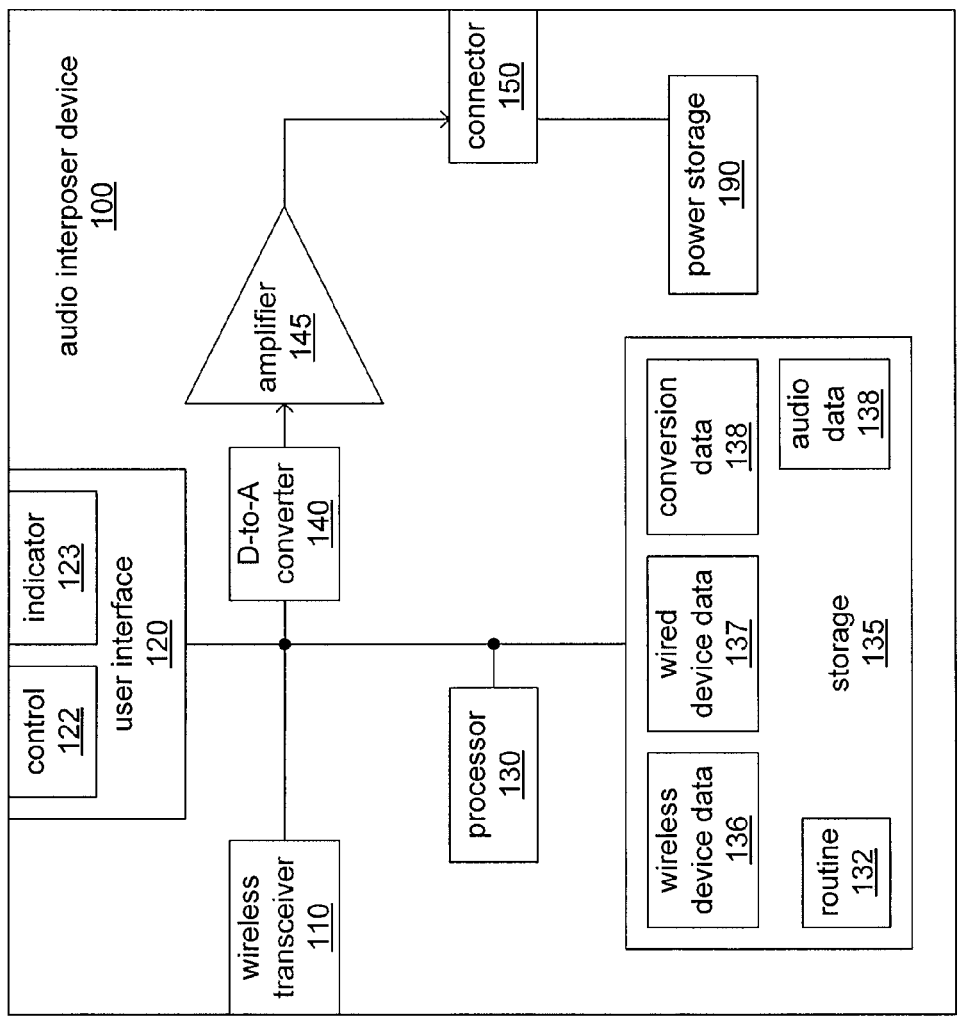
FIG. 2 is a block diagram of an audio interposer device of FIG. 1.

FIG. 2 is a block diagram of one possible internal architecture of the audio interposer device 100 of FIG. 1. The audio interposer device 100 incorporates a wireless transceiver 110, a user interface 120, a processor 130, a storage 135, a digital-to-analog (D-to-A) converter 140, an amplifier 145, the previously-discussed connector 150 and a power storage 190 storing and providing electrical power to the rest of these. As those skilled in the art of processor-based systems will readily recognize, a wide variety of bus architectures linking various ones of these may be employed, however, regardless of the exact architecture employed, the processor 130 is provided access to at least the wireless transceiver 110, the user interface 120, the storage 135 and the D-to-A converter 140. As will be explained in greater detail, the processor 130 accesses the storage 135 to retrieve a sequence of instructions making up a routine 132, and in executing the routine 132, the processor 130 is caused to perform various functions during the operation of the audio interposer device 100.

The processor 130 may be any of a variety of types of processing device, including but not limited to, a general purpose processor, a digital signal processor or other more specialized processor having a limited instruction set optimized for a given range of functions, a microcontroller or combinational logic. The storage 135 may be based on any of a wide variety of information storage technologies, including but not limited to, static RAM, dynamic RAM, ROM of either erasable or non-erasable form, FLASH, magnetic memory, ferromagnetic disk storage, phase-change storage or magneto-optical storage. The storage 135 stores at least the routine 132, and depending on what communications initialization, protocol and/or data conversions, audio processing and/or audio buffering functions are caused by the routine 132 to be performed by the processor 130, the storage 135 may also store one or more of a wireless device data 136, a wired device data 137, a conversion data 138 and an audio data 139.

The technology on which the wireless transceiver 110 is based depends on the technology of the point-to-point link formed with the wireless device with which the audio interposer device 100 wirelessly communicates (such as the personal electronic device 900 of FIG. 1). At a minimum, execution of the routine 132 causes the processor 130 to operate the wireless transceiver 110 to receive audio from the wireless device, perhaps along with non-audio data. In various embodiments, the processor 130 may be further caused by the routine 132 to operate the wireless transceiver 110 to convey commands to the wireless device. Where the wireless point-to-point link between the audio interposer device 100 and the wireless device at least partly conforms to the Bluetooth specification or a similar specification for point-to-point wireless communication, the processor 130 may be caused by the routine 132 to operate the wireless transceiver 110 to carry out a link establishment procedure to establish the point-to-point link. The processor 130 may be further caused, either during the link establishment procedure or during a subsequent link initialization procedure, to operate the wireless transceiver to exchange information concerning functional capabilities between the audio interposer device 100 and the wireless device to induce the wireless device to enable the use of various protocols and/or data formats to be used in communications between the two devices. As has already been discussed, during such an exchange of information concerning functional capabilities, the audio interposer device 100 presents false indications of its capabilities that represent a superset of the capabilities provided by various possible wired devices that may be connected to the connector 150 (as well as including any capabilities that the audio interposer device 100, itself, may provide) to ensure that the wireless device is induced into enabling the use of wide range of protocols and/or data formats.

The user interface 120 incorporates one or both of the previously-discussed control 122 and indicator 123. The control 122 may be any type of control, including but not limited to, a button, a lever switch, a rotatable knob, a touch-screen sensor, a pressure sensor, an accelerometer, a proximity sensor or an orientation sensor. The indicator 123 may be any of a number of possible devices conveying information to a user of the audio sharing device 100, including but not limited to, a graphical display capable of depicting various symbols and/or language characters, one or more LEDs, a buzzer, or a vibration-generating device. Alternatively, information may be provided to a user of the audio sharing device 100 through the output of audio conveying that information which is mixed with the audio received by the wireless transceiver 110, with the mixed audio being output to the user. Where the control 122 is provided, the control 122 may be employed by a user of the audio interposer device 100 for one or more of initiating the performance of some form of link establishment procedure, controlling one or more aspects of the provision of audio to a user (e.g., the volume employed in outputting audio to the user), and remotely controlling either the wireless device with which the point-to-point link is formed or whatever wired device is connected to the connector 150. Where the indicator 123 is provided, the indicator 123 may be employed to display information received by the wireless transceiver 110 from the wireless device, information received through the connector 150 from a wired device connected thereto, and/or information generated by the audio interposer device 100, itself.

The D-to-A converter 140 and the amplifier 145 may each be of any of a wide variety of designs and forms. The D-to-A converter 140 may be accessible by the processor 130, not only to enable the processor 130 to supply the D-to-A converter 140 with audio data, but also to enable the processor 130 to operate the D-to-A converter to support differing timings, bit formats, etc., of the audio data received from the wireless device through the wireless transceiver 110. The amplifier 145 may be accessible by the processor 130 to enable the processor to control aspects of the amplification of the analog form of audio provided by the D-to-A converter 140, including the gain used in amplification, perhaps as a form of volume control.

Although the connector 150 has been discussed as if it were a single connector, it should be noted that the connector 150 may be a implemented as a combination of multiple connectors ganged together in close proximity as is typical in numerous known forms of the connector 950 incorporated into numerous known forms of the personal electronic device 900 of FIG. 1. On such forms of the personal electronic device 900, it is commonplace to have at least one multi-pin connector alongside and in close proximity with either a distinct power connector or a distinct headphone/headset connector. It is often the intent in the design of such ganged together connectors on such a personal electronic device that more than one of those connectors may be simultaneously engaged in a connection between that personal electronic device and a wired device to which it is connected. In effect, the multiple connectors are made to be able to be simultaneously connected to as if they were a single complex connector. This is most likely to occur when such a personal electronic device is connected to a wired device that is characterized as having a docking port form of connector to be mated with. An example of this is encountered with various forms of the iPod® digital audio playing device produced by Apple Corporation of Cupertino, Calif., where a multiple-pin connector employing long-life wiping-type contacts is positioned alongside a 3.5 mm diameter female stereo headphone connector. The headphone connector allows a simple pair of earphones to be connected to the iPod device, but both of the connectors are engaged when the iPod device is connected to one of the numerous known forms of audio docking devices in a manner in which both connectors are simultaneously engaged such that they essentially behave as a single complex connector.

Also, although the discussion of the connector 150 has tended to center on implementations of the connector 150 having multiple electrically-conductive contacts for conveying at least power and audio (if not also commands and/or other data), those skilled in the art will readily recognize that the connector 150 may incorporate non-electrically-conductive approaches to conveying power, audio, commands and/or other data. By way of example, electromagnetic induction may be employed to convey power, where the connector 150 simply provides a physical guide by which the audio interposer device 100 and another device are simply brought together to put coils within each device in close enough proximity to enable induction to occur. By way of another example, the connector 150 may incorporate one or more fiber optic components to enable audio, commands and/or other data to be conveyed between the audio interposer device 100 and another device using light, instead of electricity.

Although the discussion of the conveying of audio through the connector 150 has tended to center on conveying audio that has been converted from digital to analog form with the D-to-A converter 140 and then amplified with the amplifier 145, such audio as is received by the wireless transceiver from 110 from the wireless device with which the audio interposer device 100 is in wireless communication may be conveyed through the connector 150 in digital form either in addition to or as an alternative to being conveyed in analog form. An example implementation of this may be where the connector 150 and the corresponding connector of a wired device at least partially conforms to the USB specification. In some embodiments of the audio interposer device 100, both analog and digital forms of audio may be conveyed, and in other embodiments, power savings may be achieved by conveying only one of these two forms of audio at any given time. Where audio in digital form is conveyed through the connector 150, timing and/or data format characteristics of the audio may need to be modified by the audio interposer device 100 where a mismatch exists between such characteristics of the audio received by wireless transceiver 110 and the characteristics that must be met for any audio in digital form that is conveyed to a wired device connected to the connector 150.

Given that the connector 150 is intended to mimic the functionality of the connector 950 of the personal electronic device 900, among the functions mimicked is that of recharging when the connector 150 is connected to a wired device capable of providing power for recharging the power storage 190. Typically, this would be a wired device not unlike the audio docking device 800 of FIG. 1. However, among the wired devices that may be connected to the connector 150 are simpler power supplies that in no way incorporate any form of audio or remote control capability (e.g., a typical "wall transformer").

As previously discussed, depending on the nature of the point-to-point link between the audio interposer device 100 and a wireless device transmitting audio (such as the personal electronic device 900 of FIG. 1), a link establishment procedure may be required to form the point-to-point link. In some embodiments, a user of both the audio interposer device 100 and the wireless device would operate both devices to initiate a link establishment procedure between them. For the audio interposer device 100, this may entail the processor 130 being caused by the routine 132 to monitor the control 122 for an instance of the control 122 being operated by the user to initiate the link establishment procedure, and then operating the transceiver 110 to carry out the link establishment procedure.

As also previously discussed, depending on the nature of the technology used in communications through the connector 150 with a wired device, a procedure may be required to be performed to prepare the wired connection through the connector 150 for use. Many known implementations of wired connections requiring such procedures to be performed do not require actions to be taken by a user beyond simply connecting one device to another, and therefore, the processor 130 may be caused to automatically perform such a procedure upon detecting the attachment of a wired device to the connector 150.

Following at least one of the establishment of the wireless point-to-point link and/or the connecting of a wired device to the connector 150, the processor 130 may be further caused by the routine 132 to obtain or deduce information concerning the functionality and/or identity of the wireless and wired devices. Such information may have already been provided by both devices as a result of the carrying out of the link establishment procedure (or possibly during a subsequent link initialization procedure) and/or the procedure to prepare the connector 150. Where a wireless or wired device provides an indication of its identity, but little or no indications of is functionality, the processor 130 may use such an indication of identity to retrieve data stored in the wireless device data 136 and/or the wired device data 137 stored within the storage 135 concerning functionality. However, where neither identity nor functionality information has been so provided, or where the provided information is incomplete, the processor 130 may be caused by the routine 132 to perform one or more tests on either the wireless or wired devices in an effort to deduce functionality and/or identity. By way of example, the processor 130 may be caused to test for the presence of a load or voltage level on different contacts of the connector 150 that are employed for different functions as a way of deducing what functions are supported by a given wired device. Alternatively, where the connector 150 incorporates multiple ganged together connectors, and one of the ganged together connectors incorporates a switch that changes state depending on whether or not that connector has been engaged, the processor 130 may be caused to monitor the state of that switch and infer from its change in state that the wired device must have the functionality meant to be supported by the signals normally conveyed through that connector. By way of yet another example, the processor 130 may perform various tests on either of the wired or wireless devices in which the processor 130 is caused to send various signals and observe responses, and then compare those responses to data concerning expected responses in either the wireless device data 136 or the wired device data 137.

Following at least the establishment of the wireless point-to-point link and/or the connecting of a wired device to the connector 150, the processor 130 may be further caused by the routine 132 to provide information concerning functionality to one or both of the wired and wireless devices. Whether such provision of information is necessary and the nature of that information depends on the technologies employed in the wireless point-to-point link and in the communications through the connector 150. It is likely that during the course of forming and/or initializing the wireless link, such information will have to be provided to the wireless device, especially if the wireless link is based on a wireless networking standard such as the Bluetooth specification. It is also possible that similar information will have to be provided to the wired device if it employs digital serial communications of a type conforming to the USB specification or other similar specification. As previously discussed, it is likely that the functionality information provided to the wireless device will be false information representing a superset of possible functions that may be performed by differing wired devices, while the functionality information provided to the wired device will more likely accurately reflect a combination of the actual capabilities of the wireless device and audio interposer device 100. As previously discussed, this is likely to be done simply due to the often more cumbersome and user-intensive nature of what is entailed in forming and/or initializing a wireless point-to-point link. In essence, false capabilities are presented to the wireless device in an effort to reflect what wired devices might be connected to the connector 150, rather than what wired device is actually connected to the connector 150.

By way of example, the processor 130 may be caused to operate the wireless transceiver to send indications of the audio interposer device 100 being capable of accepting audio having multiple channels (e.g., stereo or surround sound) even though a wired device connected to the connector 150 at that time is capable of accepting only monaural audio or even though there may be no wired device connected to the connector 150, at all. This would be done so as to avoid the user having to repeat either a link establishment or link initialization procedure at a later time if the user connects a wired device to the connector 150 that is capable of accepting stereo and/or surround sound audio. By way of another example, the processor 130 may be caused to operate the wireless transceiver to send indications of the audio interposer device 100 having remote control functionality such that the audio interposer device 100 is claimed to have the ability to transmit commands to remotely control the wireless device through the point-to-point link even though neither the particular embodiment of the audio interposer device 100 nor the wired device connected to the connector 150 at that time is capable of transmitting any such commands. This may be done so as to avoid the user having to repeat either a link establishment procedure or link initialization procedure at a later time if the user connects a wired device to the connector 150 that is capable of transmitting such commands.

In some embodiments, the processor 130 may be caused by the routine 132 to operate the user interface 120 to enable a user to specify what capabilities the audio interposer device 100 is to be indicated as having and/or to present the user with confirmation of whether or not the point-to-point link is established and/or initialized. In other embodiments, the processor 130 may be caused to engage the user in a procedure by which the user connects each of the wired devices that the user intends to use with the audio interposer device 100 so that the processor 130 may either receive information from each of those wired devices or perform tests on each of those wired devices to assemble a list of functions that is a superset of all of the functions performed by all of those wired devices for later presentation to a wireless device. In still other embodiments, the processor 130 may simply learn over time what wired devices the user chooses to connect to the connector 150 and assemble a list representing a superset of the capabilities of those wired devices.

With the point-to-point link established and initialized, the wireless transmitting of audio by the wireless device to the audio interposer device 100 is enabled. The processor 130, in executing the routine 132, is caused by the routine 132 to operate the wireless transceiver 110 to receive audio. Then, the processor 130 is further caused to transfer the received audio to the D-to-A converter 140 where the audio is to be conveyed through the connector 150 in analog form, and/or the processor 130 is further caused to convey the audio through the connector 150 in digital form. The processor 130 may be further caused to buffer the received audio as the audio data 139 stored within the storage 135 for various reasons. It may simply be deemed desirable to buffer the received audio as part of handling possible instances of interruptions in the point-to-point link so as to avoid a break in the output to the user through the wired device. It may be necessary to buffer the received audio to allow the processor 130 to perform various forms of signal processing on the received audio. Such signal processing may be to alter a sampling rate to make the received audio compatible with either the D-to-A converter 140 or with a wired device that requires being supplied with audio of a specific sampling rate. Such signal processing may also be part of implementing a volume control function in the digital domain. Such signal processing may further be part of converting received audio from having one quantity of audio channels of a given configuration to having a different quantity of audio channels of a different configuration (e.g., converting surround sound audio having 6 channels into stereo audio having only 2 channels). Further, it may be necessary to buffer the received audio to enable the processor 130 to either compress or decompress it under the control of the routine 132 before the audio is conveyed to a given wired device. Some of these various forms of signal processing may be conditioned on characteristics of whatever wired device is connected to the connector 150 at any given time, since a difference in capabilities between different wired devices may dictate different signal processing, compression/decompression, and/or data format conversions be performed by the processor 130. Information received directly from a wired device concerning its functionality, information concerning the identity of a wired device used to retrieve other information from the wired device data 137, and/or information deduced about the functionality of a wired device as a result of performing various tests may be employed in determining which signal processing, compression/decompression, and/or data format conversions are required to support the conveying of audio to a given wired device connected to the connector 150 at any given time.

Where a wireless device supports it, the establishment and initialization of the point-to-point link enables the transfer of commands across the point-to-point link. Commands to remotely control the wireless device may emanate from either the audio interposer device 100 or a wired device connected to the connector 150. Similarly, commands emanating from the wireless device may control one or both of the audio interposer device 100 and a wired device connected to the connector 150, depending on the nature of the command. Other forms of data, possibly including data for display on an indicator of one or more of these devices, may similarly emanate from differing ones of these devices and be directed at others of these devices. By way of example, where the audio interposer device 100 incorporates the control 122, the processor 130 may be caused by the routine 137 to monitor the control 122 for instances of a user operating the control 122 to remotely control an aspect of the operation of the wireless device, such as remote control commands to play, fast-forward or pause an audio recording that the wireless device is playing. In response to the user so operating the control 122, the processor 130 may be further caused to operate the wireless transceiver 110 to transmit a corresponding command to the wireless device. Similarly, the processor 130 may take similar action in response to the user operating the control 122 to remotely control and aspect of a wired device, conveying a corresponding command through the connector 150 to the wired device. By way of another example, where the audio interposer device 100 incorporates the indicator 123, the processor 130 may be caused by the routine 137 to respond to the receipt of a piece of data from the wireless device by operating the indicator 123 to provide an indication corresponding to that data, such as textual information concerning the origins of a piece of audio transmitted by the wireless device where the indicator 123 is capable of displaying textual information. Similarly, the processor 130 may take similar action in response to receiving a piece of data from a wired device connected to the connector 150. By way of still another example, where commands and/or data are received by the audio interposer device 100 from one of the wireless and wired devices, and either a function is involved that the audio interposer device 100 is incapable of performing or there is an explicit indication that the commands and/or data are directed to the other one of the wireless and wired devices, then the processor 130 is caused by the routine 132 to convey the commands and/or data between the wireless and wired devices.

In conveying such commands and/or data between the wired and wireless devices, the processor 130 may be caused by the routine 132 to retrieve information from the conversion data 138 concerning corresponding commands and/or ways of representing data to resolve differences between the wired and wireless devices in such commands and/or data. By way of example, where a user wishes to operate a wired device as a remote control to cause the wireless device commence playing an audio recording, the manner in which a "play" command is expressed by the wired device and conveyed through the connector 150 may not be compatible with the manner in which the wireless device must be provided with a "play" command transmitted to it across the wireless link. The wireless device may require that "play" command be preceded with a "stop" command or "reset" command to put the audio playback functions of the wireless device into a known state where the "play" command will be accepted and acted upon. Information indicating the need to precede a "play" command with another command may be stored as part of the conversion data 138 that the processor 130 uses to resolve such differences. By way of another example, there may be differences in how a given letter of an alphabet is encoded in textual transmitted by the wireless device for display on an indicator of either the wired device or of the audio interposer device 100, itself. The letter "A" may be specified with an 8-bit code by the wireless device, but may be specified by a dissimilar 6-bit code by the wired device, and the conversion data 138 may provide a table of character conversions to resolve the differences. Which conversions are used may be determined by the processor 130 in response to information concerning functionality and/or identity either received from the wired and wireless devices or deduced in tests conducted on the wired and wireless devices.

As a user employs the audio interposer device 100 in conjunction with a wireless device, the user may choose to switch between wired devices even during the performance of some function, such as the playing of audio from a recording stored on the wireless device. Aside from the processor 130 being caused to detect the change in wired devices and to carry on various ones of the aforedescribed procedures to determine the capabilities of the newly connected wired device, the processor 130 may be caused by the routine 132 to issue a series of commands to the newly attached wired device to put it in a functional state similar enough to the functional state in which the previously connected wired device was operating to allow the function that was being carried out when the switching of wired devices occurred to continue without interruption. For example, where audio was being conveyed from the wireless device to a first wired device for playing at the time the user switched to a second wired device, the processor 130 may be caused to convey various commands to the second wired device to put it in whatever functional state may be required to cause the second wired device to continue the playing of the audio.

Figure 3:
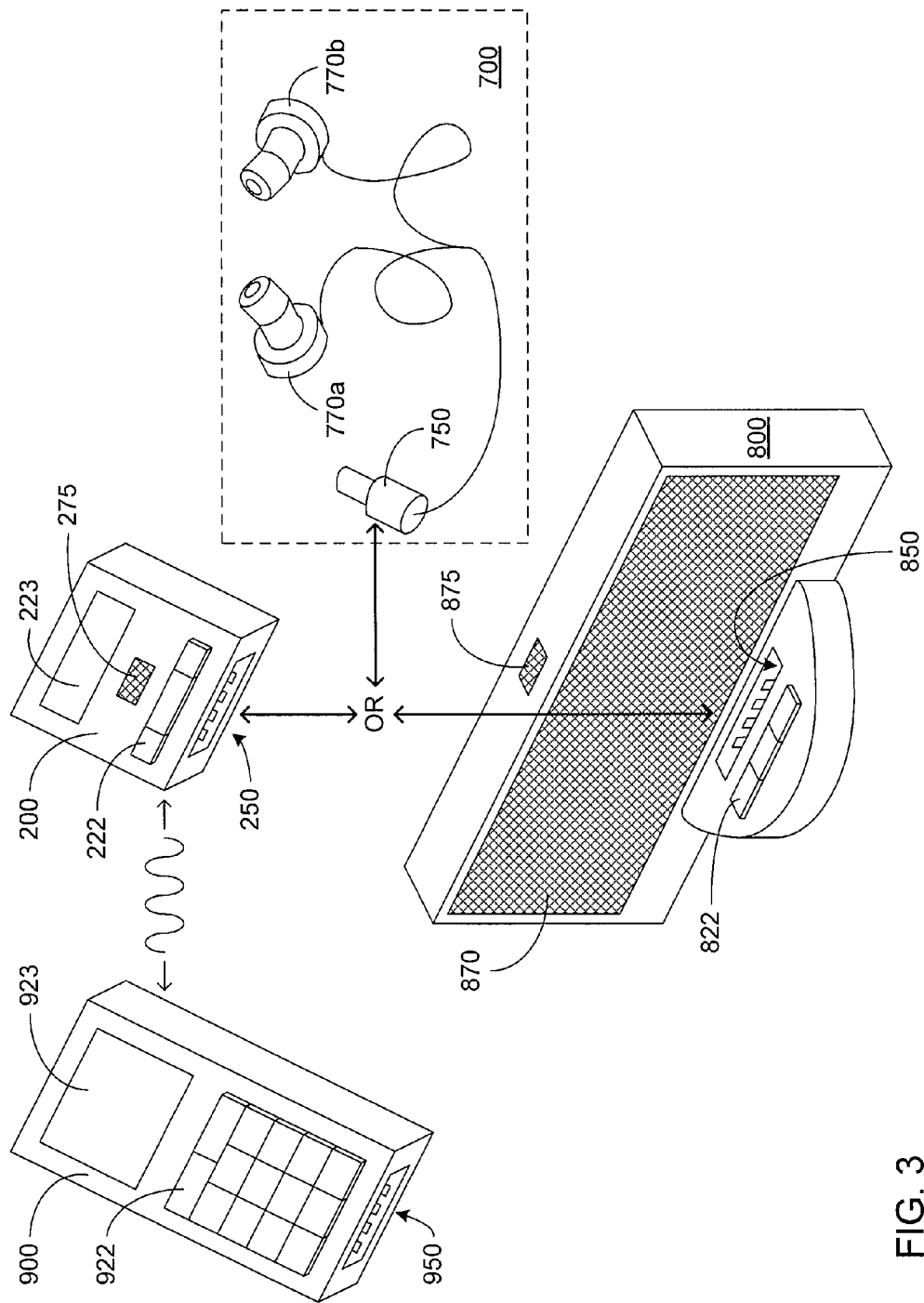
FIG. 3 depicts another audio interposer device interposed between a wireless device and one of a selection of wired devices.

FIG. 3 depicts a possible operation of another audio interposer device 200 as interposed between another personal electronic device 900 and a pair of earphones 700, or interposed between the other personal electronic device 900 and a audio docking device 800. The substantial differences between what is depicted in FIGS. 1 and 3 is that the personal electronic device 900 of FIG. 3 is capable of engaging in two-way exchanges of audio either wirelessly or through the connector 950, and the audio interposer device 200 is also capable of engaging in two-way exchanges of audio either wirelessly or through a connector 250.

Not unlike the audio interposer device 100 of FIG. 1, when interposed between the personal electronic device 900 and one or the other of the pair of earphones 700 or the audio docking device 800, the audio interposer device 200 of FIG. 3 interacts with the personal audio device 900 as a wireless device in a point-to-point wireless link using the protocols associated with that link, while also interacting as a wired device with whichever one of the earphones 700 or the audio docking device 800 is connected to the connector 250 using protocols associated with that wired connection. While so interposed, the audio interposer device 200 engages in two-exchanges of audio, commands and other forms of data between the wireless and wired forms of communications in which the audio interposer device 200 is engaged. To enable this conveyance of audio and commands, the audio interposer device 200 may engage in initialization procedures for each of the wireless and wired forms of communication where the audio interposer device 200 exchanges indications of functionality and/or identity with each of the wireless and wired devices with which the audio interposer device 200 is in communication in a manner not unlike what was described, at length, with regard to the audio interposer device 100.

With such initialization procedures completed, the audio interposer device 200 may use the indications of functionality and/or identity received from each of the wired and wireless devices with which the audio interposer device 200 is in communication to engage in a conversion between the protocols of the wireless and wired forms of communications in which the audio interposer device 200 is engaged, in a manner not unlike that of the audio interposer device 100. In essence, the audio interposer device 100 operates its connector 250 to mimic the operation of the connector 950 of the personal electronic device 900 to present a wired connection capability to wired devices meant to be substantially indistinguishable to those wired device from the wired connection capability of the personal electronic device 900. Not unlike the audio interposer device 100, providing such a wireless connection to wired devices provides a number of benefits, including a form of telepresence between devices and greater flexibility in other ways in using wired devices with the personal electronic device 900. As was the case in FIG. 1, the personal electronic device 900 of FIG. 3 may be of any of a variety of types of personal electronic device, and both the pair of earphones 700 and the audio docking device 800 are shown in FIG. 3 chiefly to illustrate some of the wide range in differences in the types of wired devices that a user of the personal electronic device 900 may use.

As was the case for the audio interposer device 100, for the audio interposer device 200 to engage in two-way exchanges of audio, commands and/or other data between itself and a wireless device (such as the personal electronic device 900), a wireless point-to-point link must first be formed between them. Similarly, for the audio interposer device 200 to engage in exchanging audio, commands and/or other data between itself and a wired device (such as either the pair of earphones 700 or the audio docking device 800), the wired device must first be connected to the connector 250. As was also the case with the audio interposer device 100, the audio interposer device 200 attempts to gather information concerning the wireless and wired device with which it is in communication, and where such information is not provided or is insufficient, the audio interposer device 200 may perform various tests to deduce such information.

Not unlike the audio interposer device 100, the audio interposer device 200 may be required to provide information concerning functionality to one or both of the wired and wireless devices. As previously discussed, due to the more cumbersome nature of the procedures required to form a wireless point-to-point link and prepare it for use in communications in comparison to the often simpler requirements for wired connections, the audio interposer device 200 may present false functionality information to the wireless device to induce the wireless device enable support for a wide range of protocols and data formats to support a flexible range of differing wired devices being connected to the connector 250.

More specifically, where the point-to-point link between the audio interposer device 200 and the wireless device at least partially conforms to the Bluetooth specification, the audio interposer device 200 may falsely indicate having support for one or more of the Bluetooth "profiles" mentioned earlier with regard to the audio interposer device 100. Alternatively and/or additionally, the two-way audio exchange capabilities of the audio interposer device 200 allows false indications for a greater number of Bluetooth profiles, and so some of the other Bluetooth profiles that the audio interposer device 200 may falsely indicate having support for may be the headset profile (HSP), the hands-free profile (HFP), the intercom profile (ICP) and the cordless telephony profile (CTP).

The exact set of false indications that the audio interposer device 100 presents to a wireless device across a point-to-point link may be permitted to be chosen by a user of the audio interposer device 200, may be a preselected set of functions deemed to be of use under most circumstances, or may be learned by the audio interposer device 200 through the audio interposer device 200 identifying various wired devices that the user attaches to the audio interposer device 200 and their functions. Regardless of how the set of false indications of functionality to be presented to the wireless device are chosen, the intention is to present a set of false indications that induce the wireless device to always enable support for a variety of protocols and/or data formats for wireless communications.

Not unlike the audio interposer device 100, the audio interposer device 200 may perform a number of conversions between protocols and/or data formats in conveying audio, commands and/or other data between the wireless link and the wired connection of the connector 250 to resolve differences therebetween. The audio interposer device may also have to generate false responses and/or false data to be provided to one or both of the wired and wireless devices as part of these conversions, especially where converting from one protocol to another or where the audio interposer device 200 must simulate the presence of a capability that may not truly be available at a given time. The audio interposer device 200 may make use of information concerning functionality and/or identity received from the wired and wireless devices to determine what conversions, false responses and/or simulations of missing capabilities are required. Such information may also be used by to alter the manner in which a user interface of the audio interposer device 200 functions.

The audio interposer device 200 may also make use of information concerning functionality and/or identity received from wired and wireless device to determine the extent to which the audio interposer device 200 may provide capabilities missing from a wired device connected to the connector 250. Referring to what is depicted in FIG. 3 as an example, where the audio interposer device 200 is connected to the pair of earphones 700 which do not provide a microphone, and where the audio interposer device 200 does incorporate a microphone 275 of its own, then upon determining that the pair of earphones 700 do not provide a microphone, the audio interposer device 200 may employ the microphone 275 to provide the otherwise missing microphone needed to support a two-way exchange of audio with the personal electronic device 900. In essence, the audio interposer device 200 could thereby effectively turn the pair of earphones 700 into part of a headset for two-way audio communications. However, if the audio interposer device 200 did not incorporate the microphone 275, in some embodiments, the audio interposer device 200 may send silent audio to the personal electronic device 900, effectively simulating there being a microphone that has been muted. Referring again to what is depicted in FIG. 3 for another example, where the audio interposer device 200 is connected to the audio docking device 800 which does incorporate a microphone 875, and where the audio interposer device 200 does incorporate a microphone 275 of its own, then upon determining that the audio docking device 800 does provide a microphone, the audio interposer device 200 refrains from employing the microphone 275, since the audio docking device 800 is able to support a two-way exchange of audio with the personal electronic device unaided. However, if the audio docking device 800 did not incorporate the microphone 875, then like the earlier example with the pair of earphones 700, the audio interposer device 200 may employ the microphone 275 to provide the missing function, effectively turning the audio docking device 800 into a speakerphone.

Figure 4:
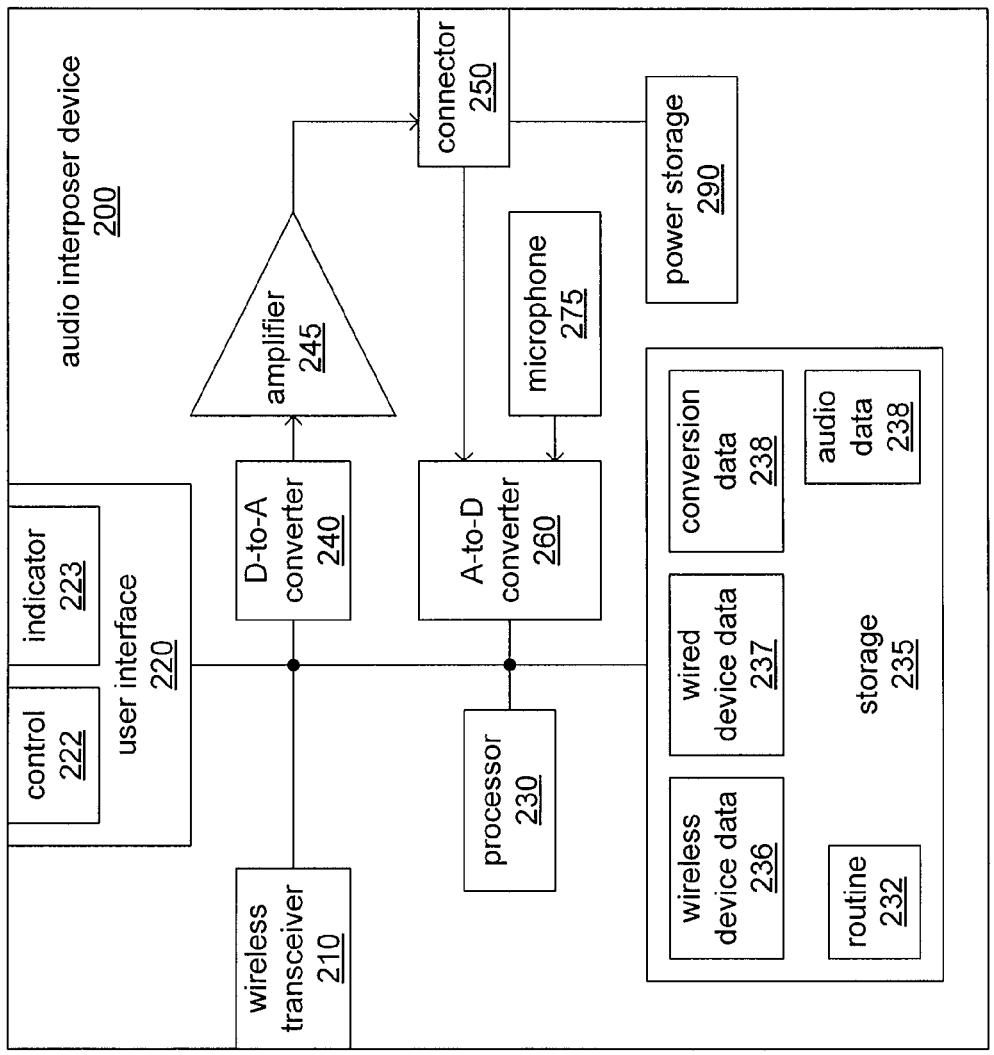
FIG. 4 is a block diagram of an audio interposer device of FIG. 3.

FIG. 4 is a block diagram of one possible internal architecture of the audio interposer device 200 of FIG. 3. The audio interposer device 200 incorporates a wireless transceiver 210, a user interface 220, a processor 230, a storage 235, a digital-to-analog (D-to-A) converter 240, an amplifier 245, the previously-discussed connector 250, an analog-to-digital (A-to-D) converter 260 and a power storage 290 storing and providing electrical power to the rest of these. The interposer device 200 may further incorporate a microphone 275 and/or an acoustic driver (not shown). As those skilled in the art of processor-based systems will readily recognize, a wide variety of bus architectures linking various ones of these may be employed, however, regardless of the exact architecture employed, the processor 230 is provided access to at least the wireless transceiver 210, the user interface 220, the storage 235, the D-to-A converter 240 and the A-to-D converter 260. As will be explained in greater detail, the processor 230 accesses the storage 235 to retrieve a sequence of instructions making up a routine 232, and in executing the routine 232, the processor 230 is caused to perform various functions during the operation of the audio interposer device 200.

Intro to Internal Components

As was the case with the audio interposer device 100, the processor 230 of the audio interposer device 200 may be any of a variety of types of processing device, and the storage 235 may be based on any of a wide variety of information storage technologies. The storage 235 stores at least the routine 232, and depending on what communications initialization, protocol and/or data conversions, audio processing and/or audio buffering functions are caused by the routine 232 to be performed by the processor 230, the storage 235 may also store one or more of a wireless device data 236, a wired device data 237, a conversion data 238 and an audio data 239. At a minimum, execution of the routine 232 causes the processor 230 to operate the wireless transceiver 210 to exchange two-way audio with the wireless device, perhaps along with non-audio data, and the processor 230 may be further caused to operate the wireless transceiver 210 to exchange commands with the wireless device. Where the wireless point-to-point link between the audio interposer device 200 and the wireless device at least partly conforms to the Bluetooth specification or a similar specification for point-to-point wireless communication, the processor 230 may be caused by the routine 232 to operate the wireless transceiver 210 to carry out a link establishment procedure to establish the point-to-point link, and/or to exchange information concerning functional capabilities between the audio interposer device 200 and the wireless device to induce the wireless device to enable the use of various protocols and/or data formats to be used in communications between the two devices.

Not unlike the user interface 120 of the audio interposer device 100, the user interface 220 incorporates one or both of the previously-discussed control 222 and indicator 223. The control 222 may be any type of manually-operable control, and the indicator 223 may be any of a number of possible devices conveying information to a user of the audio sharing device 200. Alternatively, information may be provided to a user of the audio sharing device 200 through the output of audio conveying that information which is mixed with other audio being output to the user. The D-to-A converter 240, the amplifier 245 and the A-to-D converter 260 may each be of any of a wide variety of designs and forms. The D-to-A converter 240 and the A-to-D converter 260 may be accessible by the processor 230, not only to enable the processor 230 to supply the D-to-A converter 240 with audio data and receive audio data from the A-to-D converter 260, but also to enable the processor 230 to operate the D-to-A converter 240 and the A-to-D converter 260 to support differing timings, bit formats, etc., of audio data.

As was the case with the connector 150 of the audio interposer device 100, the connector 250 may be a implemented as a combination of multiple connectors ganged together in close proximity as is typical in numerous known forms of the connector 950 incorporated into numerous known forms of the personal electronic device 900. Also, the connector 250 may incorporate non-electrically-conductive approaches to conveying power, audio, commands and/or other data, including electromagnetic induction and/or fiber optics. Further, audio may be exchanged through the connector 250 in analog and/or digital forms. Also, among the functions of the connector 950 that the connector 250 may mimic is that of conveying power when the connector 250 is connected to a wired device capable of providing power for recharging the power storage 290.

Not unlike with the audio interposer device 100, with the audio interposer device 200, a link establishment procedure may be required to form the point-to-point link with the wireless device, requiring the to operate both devices to initiate a link establishment procedure between them in some embodiments. For the audio interposer device 200, this may entail the processor 230 being caused by the routine 232 to monitor the control 222 for an instance of the control 222 being operated by the user to initiate the link establishment procedure, and then operating the transceiver 210 to carry out the link establishment procedure. Also, a procedure may be required to be performed to prepare the wired connection through the connector 250 for use, and may entail the processor 230 being caused to automatically perform such a procedure upon detecting the attachment of a wired device to the connector 250.

As was the case with the interposer device 100, following the establishment of the wireless point-to-point link and/or the connecting of a wired device to the connector 250 of the audio interposer device 200, the processor 230 may be further caused by the routine 232 to obtain or deduce information concerning the functionality and/or identity of the wireless and wired devices. Where a wireless or wired device provides an indication of its identity, but little or no indications of is functionality, the processor 230 may use such an indication of identity to retrieve data stored in the wireless device data 236 and/or the wired device data 237 stored within the storage 235 concerning functionality. However, where neither identity nor functionality information has been so provided, or where the provided information is incomplete, the processor 230 may be caused by the routine 232 to perform one or more tests on either the wireless or wired devices in an effort to deduce functionality and/or identity.

As was also the case with the interposer device 100, following at least the establishment of the wireless point-to-point link and/or the connecting of a wired device to the connector 250, the processor 230 may be further caused by the routine 232 to provide information concerning functionality to one or both of the wired and wireless devices. It is likely that the functionality information provided to the wireless device will be false information representing a superset of possible functions that may be performed by differing wired devices, while the functionality information provided to the wired device will more likely accurately reflect a combination of the actual capabilities of the wireless device and audio interposer device 200. In some embodiments, the processor 230 may be caused by the routine 232 to provide a capability for a user to specify what false indications of capabilities the audio interposer device 200 will present to the wireless device. In other embodiments, the routine 232 causes the processor 230 to observe what wired devices are used with the audio interposer device 200 and to assemble a list of capabilities representing a superset of the capabilities of those wired devices to be falsely presented to the wireless device as being the capabilities of the audio interposer device 200. In this way, a user is able to switch between different wired devices without having to incur cumbersome procedures to enable their use. By way of example, the processor 230 may be caused to operate the wireless transceiver to send indications of the audio interposer device 200 having a microphone by which audio could be detected and conveyed back to the wireless device even though the audio interposer device 200 may not incorporate the microphone 275 and the wired device connected to the connector 250 at that time also does not provide a microphone. This would be done so as to avoid the user having to repeat either a link establishment or link initialization procedure at a later time if the user connects a wired device to the connector 250 that does provide a microphone.

With the point-to-point link established and initialized, the wireless exchange of audio between the wireless device to the audio interposer device 200 is enabled. The processor 230, in executing the routine 232, is caused by the routine 232 to operate the wireless transceiver 210 to send and receive audio. The processor 230 is also caused to transfer the received audio to the D-to-A converter 240 where the audio is to be conveyed through the connector 250 in analog form, and/or the processor 230 is also caused to convey the received audio through the connector 250 in digital form. The processor 230 is further caused to operate the A-to-D converter to retrieve audio that has been converted to digital form or the processor 230 is further caused to accept audio in digital form from the wired device. The processor 230 is then still further caused to transfer the audio received from the A-to-D converter or directly in digital form from the connector 250 to the transceiver 210 to send to the wireless device. Amidst these transfers of audio, the processor 230 may be further caused to buffer the some or all of the audio as the audio data 239 stored within the storage 235 for various reasons as has been previously discussed with regard to the audio interposer device 100, including preventing instances of breakage in the audio, performing signal processing to change between differing quantities of audio channels and/or different timings, and/or to compress/decompress audio or otherwise change audio formats. Some of these various forms of signal processing may be conditioned on characteristics of whatever wired or wireless devices are in communication with the audio interposer device 200 at any given time, since a difference in capabilities between different wired devices may dictate different signal processing, compression/decompression, and/or data format conversions be performed by the processor 230. Information concerning capabilities of either the wired or wireless devices may be employed in determining which signal processing, forms of compression/decompression, and/or data format conversions are required to support the exchange of audio between a given wired device and a given wireless device.

Where a wireless device supports it, the establishment and initialization of the point-to-point link enables the exchange of commands across the point-to-point link. Commands to remotely control the wireless device may emanate from either the audio interposer device 200 or a wired device connected to the connector 250. Similarly, commands emanating from the wireless device may control one or both of the audio interposer device 200 and a wired device connected to the connector 250. Other forms of data may similarly emanate from differing ones of these devices and be directed at others of these devices. In exchanging commands and/or data between the wired and wireless devices, the processor 230 may be caused by the routine 232 to retrieve information from the conversion data 238 concerning corresponding commands and/or ways of representing data to resolve differences between the wired and wireless devices in such commands and/or data. Which conversions are used may be determined by the processor 230 in response to information concerning functionality and/or identity either received from the wired and wireless devices or deduced in tests conducted on the wired and wireless devices.

As a user employs the audio interposer device 200 in conjunction with a wireless device, the user may choose to switch between wired devices even during the performance of some function, such as a two-way exchange of audio as a result of being involved in a telephone conversation through the wireless device. Aside from the processor 230 being caused to detect the change in wired devices and to carry on various ones of the aforedescribed procedures to determine the capabilities of the newly connected wired device, the processor 230 may be caused by the routine 232 to issue a series of commands to the newly attached wired device to put it in a functional state similar enough to the functional state in which the previously connected wired device was operating to allow the function that was being carried out when the switching of wired devices occurred to be continued by the newly connected wired device without interruption.

Figure 5:
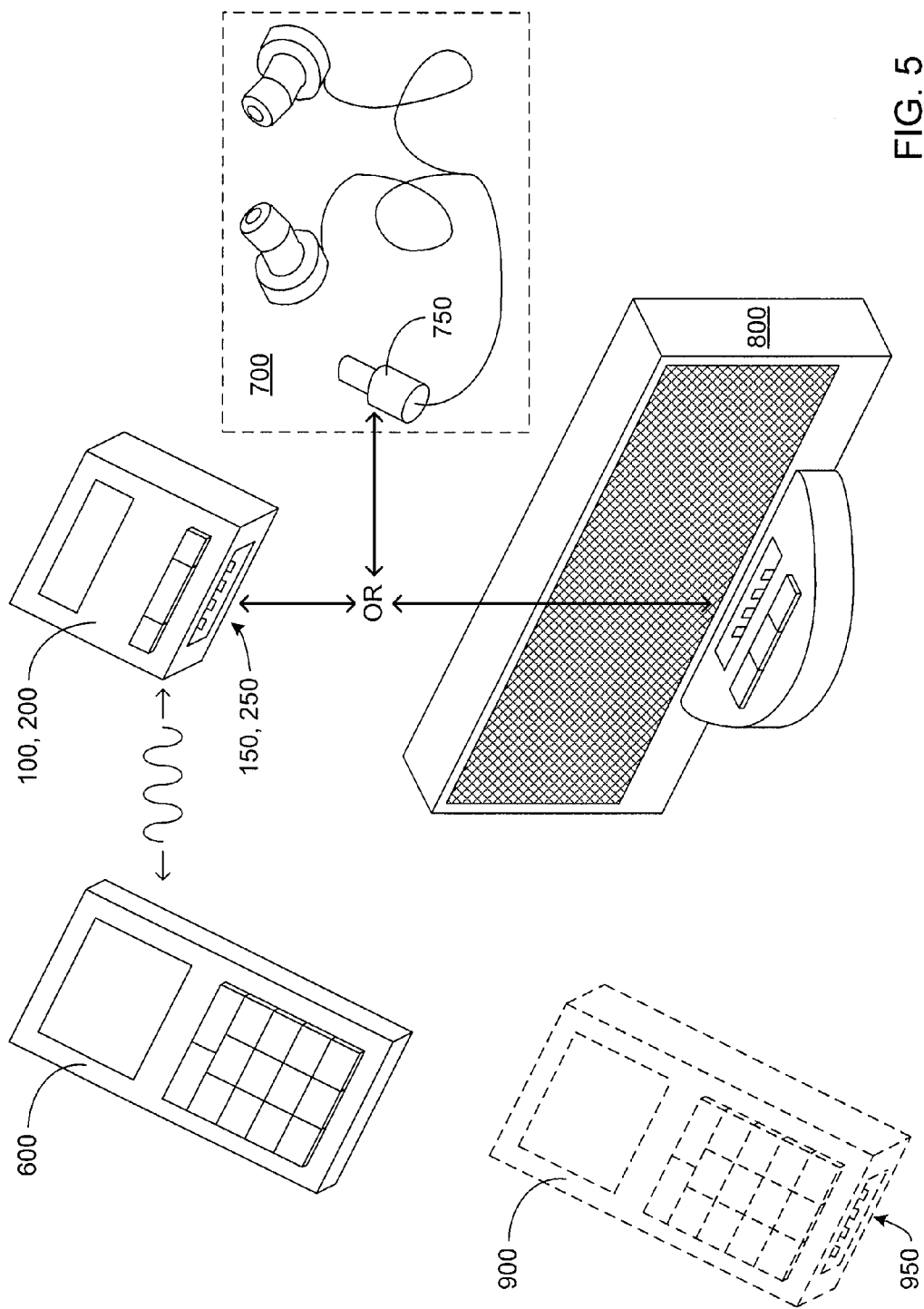
FIG. 5 depicts still another audio interposer device interposed between a wireless device and one of a selection of wired devices.

FIG. 5 depicts a possible operation of either a variant of the audio interposer devices 100 and 200 described earlier as interposed between a personal electronic device 600 and a pair of earphones 700, or interposed between the personal electronic device 600 and an audio docking device 800. What is depicted in FIG. 5 is largely similar to what is depicted in FIG. 1 where the audio interposer device 100 is used, and is substantially similar to what is depicted in FIG. 3 where the audio interposer device 200 is used. The substantial difference between what is depicted in FIGS. 1 and 3 and what is depicted in FIG. 5 is that the personal electronic device 600, unlike either of the variants of personal electronic device 900, does not have a connector to enable the connection of wired devices to the personal electronic device 600. Therefore, instead of the audio interposer devices 100 or 200 mimicking the functionality of such a connector incorporated into the personal electronic device 600, which does not have such a connector, the audio interposer devices 100 or 200 mimic the functionality of the connector 950 of a personal electronic device 900, which is shown in broken lines since it is not participating in communications involving the audio interposer devices 100 or 200.

As a result, the audio interposer devices 100 and 200 cannot rely on identifying either the functionality of the personal electronic device 600 or the personal electronic device 600, itself, to determine any characteristics of the manner in which the connectors 150 and 250, respectively, should be operated. To resolve this, the processors 130 and 230 of these variants of the audio interposer devices 100 and 200, respectively, are caused by the routines 132 and 232 to resort to a default set of characteristics for the manner in which the connectors 150 and 250 should be operated in some embodiments. Alternatively, in other embodiments, the processors 130 and 230 are caused to operate the user interfaces 120 and 220, respectively, to allow a user to specify a known wireless device having such a connector that the user wishes the audio interposer devices 100 and 200 to mimic.

Referring back to the earlier variants of the audio interposer devices 100 and 200 that do rely on identifying either the functionality or the identity of a given personal electronic device 900 to determine characteristics of the functionality of their respective connectors 150 and 250, it may still be desirable for the routines 132 and 232 to cause the processors 130 and 230 to provide the user with the option of overriding such identification efforts in favor of the user specifying a known wireless device having a such a connector that the user wishes the audio interposer devices 100 and 200 to mimic. As those skilled in the art will readily recognize, it is not unheard of for different models of personal electronic device having identical connectors for the attachment of wired devices to operate their respective connectors with some differences between them in terms of signal timings, signal strengths, recognition of protocol steps, etc. These differences may arise through changes in components from one model to another, changes in programming from one model to another, design mistakes made in only some models, etc. Such differences may cause a given wired device to interact more effectively with one model versus another, despite both models having what is purported to be identical connectors to which the wired device may be attached. By way of example, one model may employ an audio amplifier providing analog audio to the connector with a first set of characteristics, while another model may employ a somewhat different audio amplifier providing analog audio to what should be the same connector, but with an unavoidably different second set of characteristics. It may then later be discovered that a given wired audio device that accepts the amplified analog audio through this connector is able to function more optimally with the analog audio from one model than from the other model. With such a difference in mind, the audio interposer devices 100 or 200 may allow the user to select which of these models to emulate in terms of the characteristics with which analog audio is modified in order to better suit a given wired device that the user wishes to use with that audio interposer device.

Figure 6:
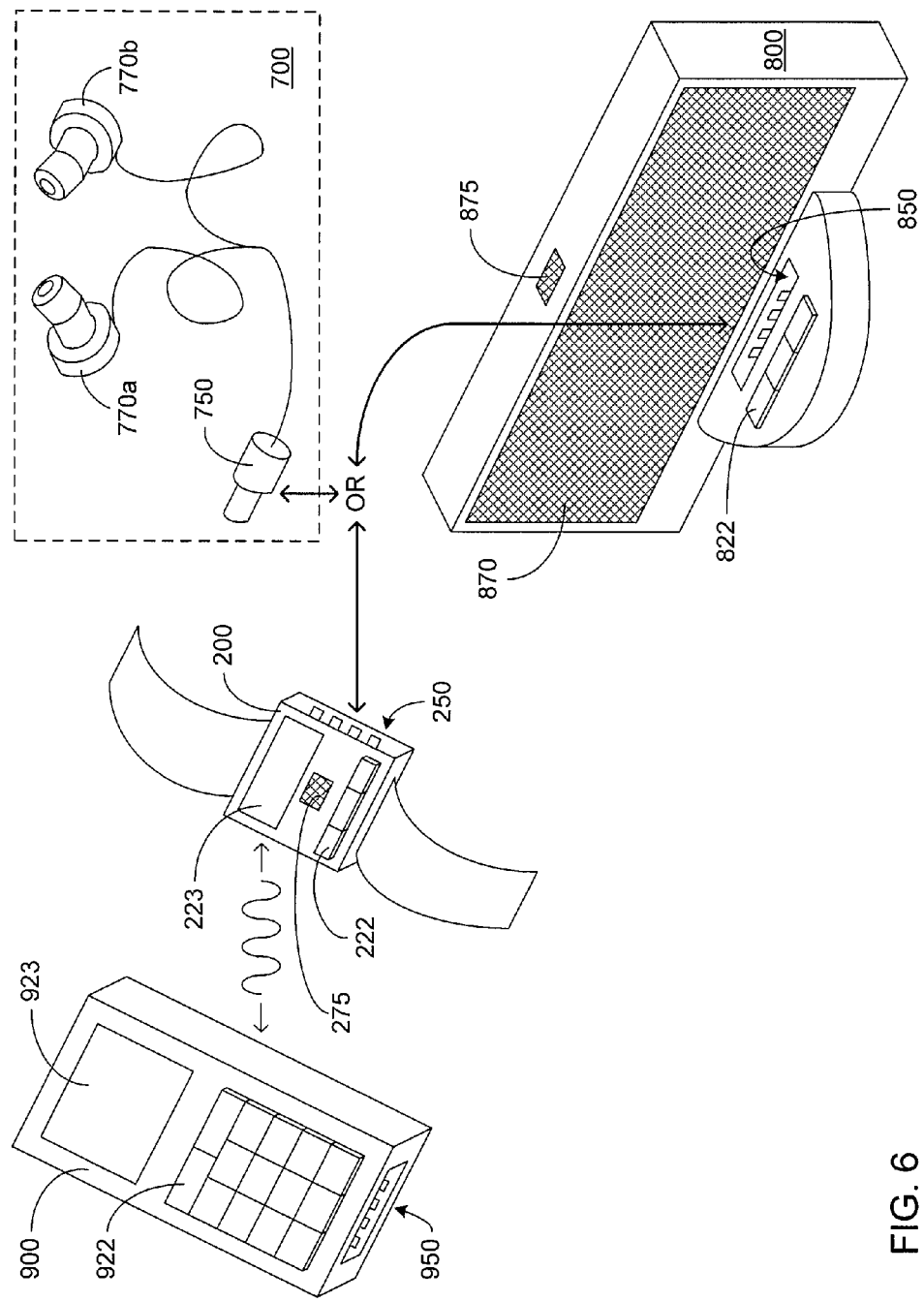
FIG. 6 depicts an alternate physical form of an audio interposer device.
Figure 7:
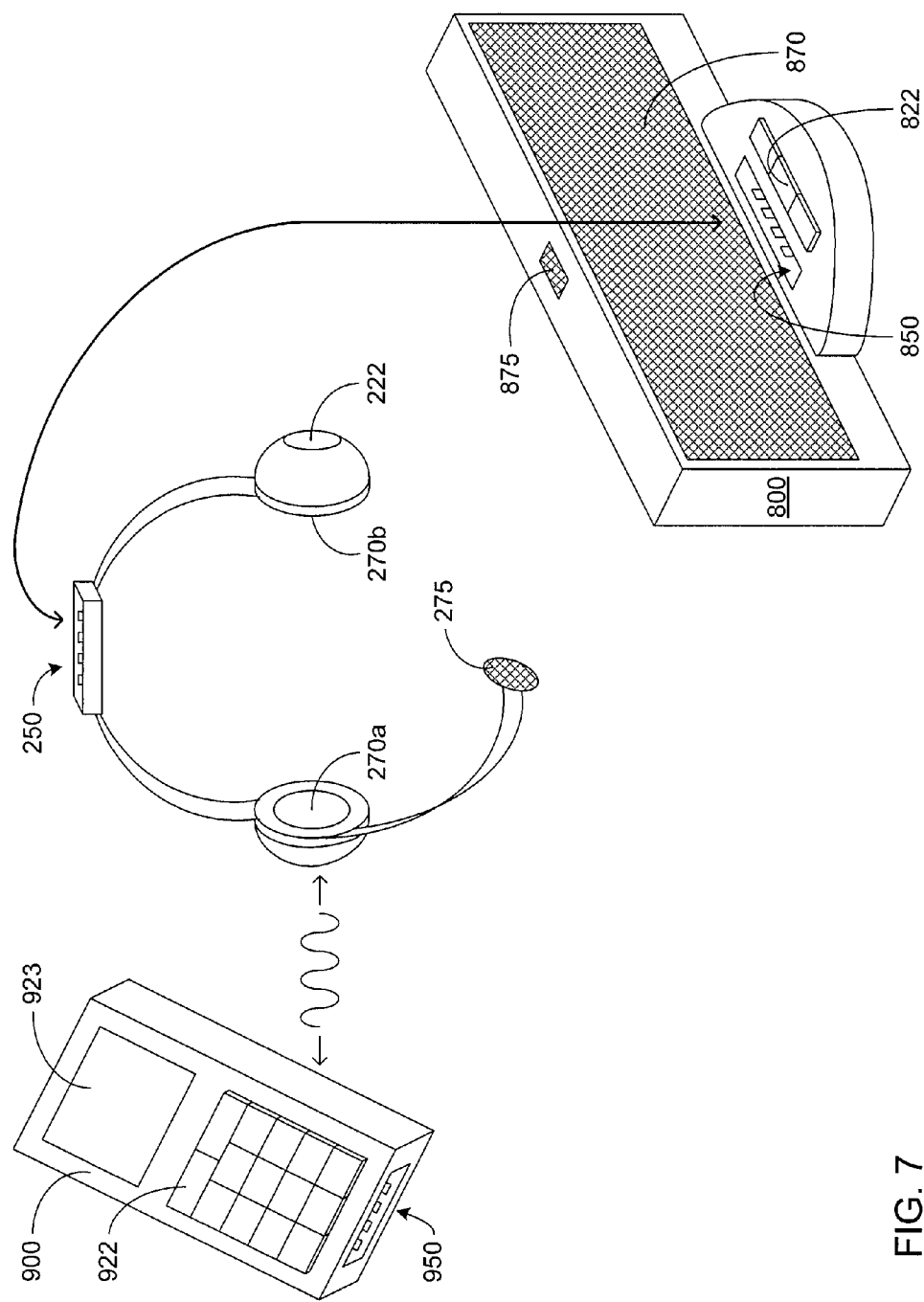
FIG. 7 depicts another alternate physical form of an audio interposer device.

FIGS. 6 and 7 depict possible operations of still other variants of the audio interposer devices 100 and 200 described earlier as interposed between a personal electronic device 900 and a pair of earphones 700, or interposed between the personal electronic device 900 and an audio docking device 800. The substantial difference between the depicted variants of the audio interposer devices 100 and 200 in FIGS. 6 and 7 from earlier depicted variants of the audio interposer devices 100 and 200, respectively, is that while the earlier variants were of simpler box shapes that may have been worn as pendants around the neck or clipped to clothing, the variants depicted in FIGS. 6 and 7 are meant to be strapped to a wrist or arm or worn on a user's head. However, as those skilled in the art will readily recognize, various variants of the audio interposer devices 100 and 200 may be shaped and sized in a wide variety of ways, and the specific depictions of physical forms herein should not be construed as limiting.

Figure 8:
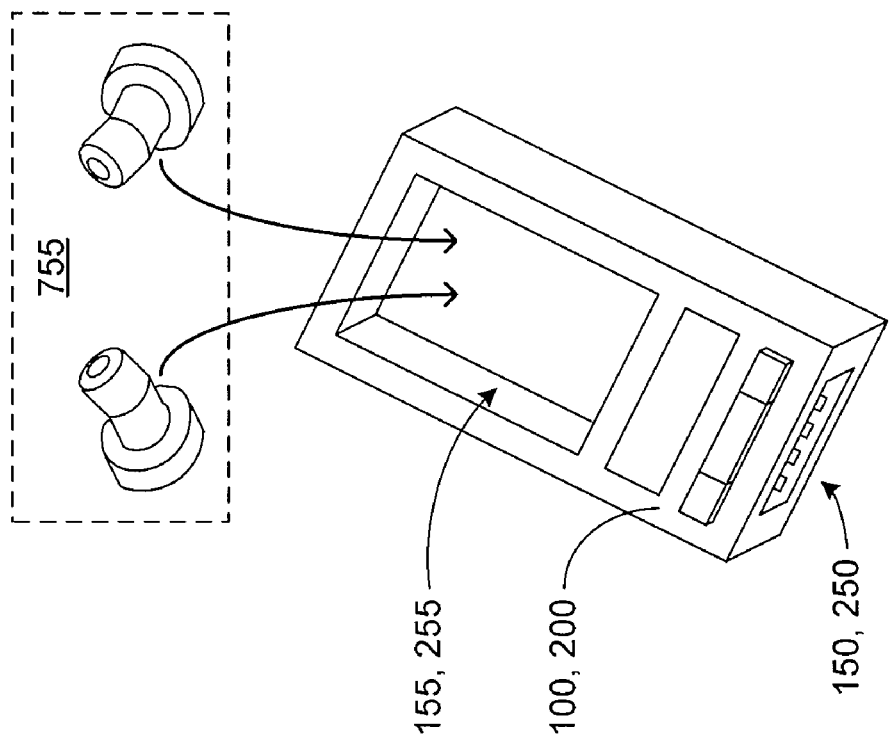
FIG. 8 depicts an audio interposer supporting wireless earphones.

FIG. 8 depicts yet another variant of the audio interposer devices 100 or 200. This variant is similar to its earlier-described counterparts in operating interposed between wired and wireless devices to carry out communications with both and exchange audio, commands and/or data therebetween. However, this variant of the audio interposer devices 100 or 200 incorporate a cradle 155 or 255, respectively, within which may be carried a pair of wireless earphones 755.

Where these variants of the audio interposer devices 100 or 200 are not being used with a wired device to output sound to a user, the user may remove the pair of wireless earphones from the cradle 155 or 255, respectively, and use them to listen to audio. While inserted within the cradle 155 or 255, the pair of wireless earphones 755 may be recharged with power supplied either from the power storage 190 or 290, or from a wired device connected to the connector 150 or 250, respectively.

Other embodiments are within the scope of the following claims.

The invention claimed is:

1. An apparatus comprising:
a processor;
a transceiver accessible to the processor and configured to engage in wireless communications with a wireless device across a point-to-point link to receive a first piece of audio from the wireless device;
a connector accessible to the processor and configured to connect with a wired device to convey the first piece of audio to the wired device through the connector; and
a storage accessible to the processor and having a routine stored therein comprising a sequence of instructions that when executed by the processor configures the processor to:
operate the transceiver to transmit to the wireless device across the point-to-point link formed with the wireless device a false indication that the apparatus is capable of performing at least one audio function associated with the first piece of audio that the apparatus is not capable of performing to induce the wireless device to enable the use of a protocol across the link to transfer the first piece of audio across the link;
await an indication that the wired device is connected to the connector;
operate the transceiver to use the protocol to enable the wireless device to transfer the first piece of audio across the link using the protocol; and
convey the first piece of audio to the wired device through the connector to enable the wired device to perform the at least one audio function.

2. The apparatus of claim 1, wherein the processor is further caused to operate the transceiver to form the link in a manner in conformance with the Bluetooth specification.

3. The apparatus of claim 1, wherein the connector is structured to mimic the functions of a substantially similar connector of the wireless device to enable the wired device to be connected alternately to either of the apparatus and the wireless device to perform the at least one audio function.

4. The apparatus of claim 3, wherein the connector comprises a ganged together plurality of connectors that are engaged substantially simultaneously when the wired device is connected to the apparatus.

5. The apparatus of claim 1, wherein the at least one audio function comprises the exchange of two-way audio with the wireless device, and the protocol supports the transfer of two-way audio between the apparatus and the wireless device.

6. The apparatus of claim 1, wherein the at least one audio function comprises operating as a remote control device to remotely control an aspect of the transfer of the first piece of audio across the link by the wireless device, and the protocol supports the transfer of remote control commands across the link to the wireless device.

7. The apparatus of claim 1, further comprising a user interface having a manually-operable control, wherein the connector is structured to mimic the function of a substantially similar connector of one alternate wireless device of a plurality of alternate wireless devices such that the wired device is able to be connected alternately to either of the apparatus and the one alternate wireless device of the plurality of alternate wireless devices to perform the at least one audio function, and wherein the processor is further caused to operate the user interface to enable a user of the apparatus to select the one alternate wireless device from among the plurality of alternate wireless devices.

8. The apparatus of claim 1, further comprising a user interface having a manually-operable control, wherein the processor is further caused to operate the user interface to enable a user of the apparatus to select the audio function that the apparatus is to be falsely indicated as being capable of performing.

9. The apparatus of claim 1, wherein the processor is further caused to:
monitor the connector for indications of the connection of each wired device of a plurality of wired devices;
determine what audio functions are performed by each wired device of the plurality of wired devices as each wired device is connected to the connector;
assemble a list representing a superset of audio functions found to be supported by each wired device; and
transmit the list to the wireless device as the at least one audio function that the apparatus is falsely indicated as being capable of performing.

10. The apparatus of claim 9, wherein the processor is further caused to:
await an indication of what audio functions are performed by each wired device of the plurality of wired devices to be conveyed by each wired device of the plurality of wired devices to the apparatus through the connector;
perform a series of tests on a wired device of the plurality of wired devices in response to the wired device of the plurality of wired devices not providing an indication of what audio functions are performed by the wired device of the plurality of wire devices to deduce the audio functions that are performed by the wired device of the plurality of wired devices.

11. The apparatus of claim 3, wherein the processor is further caused to:
retrieve data concerning another protocol employed in mimicking the functions of the substantially similar connector of the wireless device; and convert between the protocol that the wireless device is induced into using and the another protocol to enable the wired device to perform the at least one audio function.

12. The apparatus of claim 5, wherein the at least one audio function comprises detecting sound and conveying the sound to the wireless device as part of the exchange of two-way audio.

13. The apparatus of claim 7, wherein the processor is further caused to:
retrieve data concerning another protocol employed in mimicking the functions of the substantially similar connector of the one alternate wireless device; and
convert between the protocol that the wireless device is induced into using and the another protocol to enable the wired device to perform the at least one audio function.

14. A method comprising:
transmitting to a wireless device across a point-to-point link formed with the wireless device a false indication that an apparatus to which a wired device is connected is capable of performing at least one audio function of which the apparatus is not capable of performing to induce the wireless device to enable the use of a protocol across the link to transfer a first piece of audio across the link to the apparatus;
operate a transceiver of the apparatus to use the protocol to enable the wireless device to transfer the first piece of audio across the link using the protocol;
determine that the wired device is capable of performing the at least one audio function; and
convey the first piece of audio to the wired device through a wired connection through a connector of the apparatus to enable the wired device to perform the at least one audio function.

15. The method of claim 14, further comprising operating the connector to mimic the functions of a substantially similar connector of the wireless device to enable the wired device to be connected alternately to either the apparatus or the wireless device to perform the at least one audio function.

16. The method of claim 15, further comprising converting between the protocol that the wireless device is induced into using and another protocol employed in mimicking the functions of the substantially similar connector of the wireless device.

17. The method of claim 14, wherein the at least one audio function comprises the exchange of two-way audio with the wireless device, and the protocol supports the transfer of two-way audio between the apparatus and the wireless device.

18. The method of claim 17, wherein the at least one audio function comprises detecting sound and conveying the sound to the wireless device as part of the exchange of two-way audio.

19. The method of claim 14, wherein the at least one audio function comprises operating as a remote control device to remotely control an aspect of the transfer of the first piece of audio across the link by the wireless device, and the protocol supports the transfer of remote control commands across the link to the wireless device.

20. The method of claim 14, further comprising:
operating the connector to mimic the function of a substantially similar connector of one alternate wireless device of a plurality of alternate wireless devices such that the wired device is able to be connected alternately to either of the apparatus and the one alternate wireless device of the plurality of alternate wireless devices to perform the at least one audio function; and operate a user interface to enable a user of the apparatus to select the one alternate wireless device from among the plurality of alternate wireless devices.

21. The method of claim 20, further comprising converting between the protocol that the wireless device is induced into using and another protocol employed in mimicking the functions of the substantially similar connector of the one alternate wireless device.

22. The method of claim 14, further comprising operating a user interface to enable a user of the apparatus to select the audio function that the apparatus is to be falsely indicated as being capable of performing.

23. The method of claim 14, further comprising:
monitoring the connector for indications of the connection of each wired device of a plurality of wired devices;
determining what audio functions are performed by each wired device of the plurality of wired devices as each wired device is connected to the connector;
assembling a list representing a superset of audio functions found to be supported by each wired device; and
transmitting the list to the wireless device as the at least one audio function that the apparatus is falsely indicated as being capable of performing.

24. The method of claim 23, further comprising:
awaiting an indication of what audio functions are performed by each wired device of the plurality of wired devices to be conveyed by each wired device of the plurality of wired devices through the connector; and
performing a series of tests on a wired device of the plurality of wired devices in response to the wired device of the plurality of wired devices not providing an indication of what audio functions are performed by the wired device of the plurality of wire devices to deduce the audio functions that are performed by the wired device of the plurality of wired devices.

25. A non-transitory machine-readable medium storing a sequence of instructions that when executed by a processor of an audio interposer device cause the processor to:
transmit to a wireless device across a point-to-point link formed with the wireless device a false indication that the audio interposer device is capable of performing at least one audio function of which the audio interposer device is not capable of performing to induce the wireless device to enable the use of a protocol across the link to transfer a first piece of audio across the link;
operate the transceiver to use the protocol to enable the wireless device to transfer the first piece of audio across the link using the protocol;
determine that a wired device connected to the audio interposer device through a connector of the audio interposer device is capable of performing the at least one audio function; and
convey the first piece of audio to the wired device through a wired connection through the connector to enable the wired device to perform the at least one audio function.

26. The non-transitory machine-readable medium of claim 25, wherein the processor is further caused to operate a user interface to enable a user of the audio interposer device to select the audio function that the audio interposer device is to be falsely indicated as being capable of performing.

27. The non-transitory machine-readable medium of claim 25, wherein the processor is further caused to:
monitor the connector for indications of the connection of each wired device of a plurality of wired devices;
determine what audio functions are performed by each wired device of the plurality of wired devices as each wired device is connected to the connector;

assemble a list representing a superset of audio functions found to be supported by each wired device; and transmit the list to the wireless device as the at least one audio function that the audio interposer device is falsely indicated as being capable of performing.

28. The non-transitory machine-readable medium of claim 25, wherein the processor is further caused to:

await an indication of what audio functions are performed by each wired device of the plurality of wired devices to be conveyed by each wired device of the plurality of wired devices through the connector; and perform a series of tests on a wired device of the plurality of wired devices in response to the wired device of the plurality of wired devices not providing an indication of what audio functions are performed by the wired device of the plurality of wire devices to deduce the audio functions that are performed by the wired device of the plurality of wired devices.

* * * * *